(12) United States Patent
Wallerstorfer et al.

(10) Patent No.: US 8,354,023 B2
(45) Date of Patent: Jan. 15, 2013

(54) TANK

(75) Inventors: Kurt Wallerstorfer, Strasswalchen (AT); Andreas Wawrla, Widnau (CH); Roland Scholz, Haan (DE)

(73) Assignee: Aquis Wasser-Luft-Systeme GmbH, Lindau, Zweigniederlassung Rebstein, Rebstein (CH)

( * ) Notice: Subject to any disclaimer, the term of this patent is extended or adjusted under 35 U.S.C. 154(b) by 430 days.

(21) Appl. No.: 12/310,062

(22) PCT Filed: Aug. 10, 2007

(86) PCT No.: PCT/EP2007/007112
§ 371 (c)(1),
(2), (4) Date: Apr. 16, 2009

(87) PCT Pub. No.: WO2008/017509
PCT Pub. Date: Feb. 14, 2008

(65) Prior Publication Data
US 2009/0266757 A1  Oct. 29, 2009

(30) Foreign Application Priority Data
Aug. 10, 2006  (DE) .......................... 10 2006 037 636

(51) Int. Cl.
*B01D 35/30* (2006.01)
*B01D 37/00* (2006.01)

(52) U.S. Cl. ........ 210/232; 210/241; 210/248; 210/348; 210/513

(58) Field of Classification Search ................. 251/149.9
See application file for complete search history.

(56) References Cited

U.S. PATENT DOCUMENTS

| 3,206,033 | A | 9/1965 | Kern, Jr. |
| 5,186,829 | A * | 2/1993 | Janik .............................. 210/232 |
| 5,342,518 | A | 8/1994 | Posner et al. |
| 5,860,354 | A | 1/1999 | Jouatel et al. |
| 6,576,129 | B1 | 6/2003 | Reid |
| 2002/0144937 | A1 | 10/2002 | Wilberscheid |
| 2002/0170279 | A1 | 11/2002 | Gustafson |
| 2004/0129627 | A1 | 7/2004 | McGibbon |

(Continued)

FOREIGN PATENT DOCUMENTS

CH  432 395  9/1967

(Continued)

OTHER PUBLICATIONS

U.S. Appl. No. 12/310,061, filed Feb. 10, 2009.

(Continued)

*Primary Examiner* — Krishnan S Menon
*Assistant Examiner* — Allison M Gionta
(74) *Attorney, Agent, or Firm* — Breneman & Georges

(57) ABSTRACT

A tank is proposed for appliances which use water, in particular domestic appliances or appliances for preparation of foodstuffs and/or drinks, such as automatic drinks machines, in particular automatic coffee machines, drinking water dispensers, cooking and baking appliances, steam appliances, in particular steam irons, steam cleaners, high-pressure cleaners, air cleaners and conditioners or the like, wherein a suction connection is provided on the tank in order to suck in water from the tank by means for production of a reduced pressure, and a filter connection is provided for connection of a filter cartridge in the interior of the tank, while ensuring that only one permissible filter type is used. A tank according to the invention is distinguished by mechanical coding structures on the filter connecting element, in order to prevent the use of a filter cartridge which does not correspond to the tank.

21 Claims, 34 Drawing Sheets

U.S. PATENT DOCUMENTS

Figure 1:
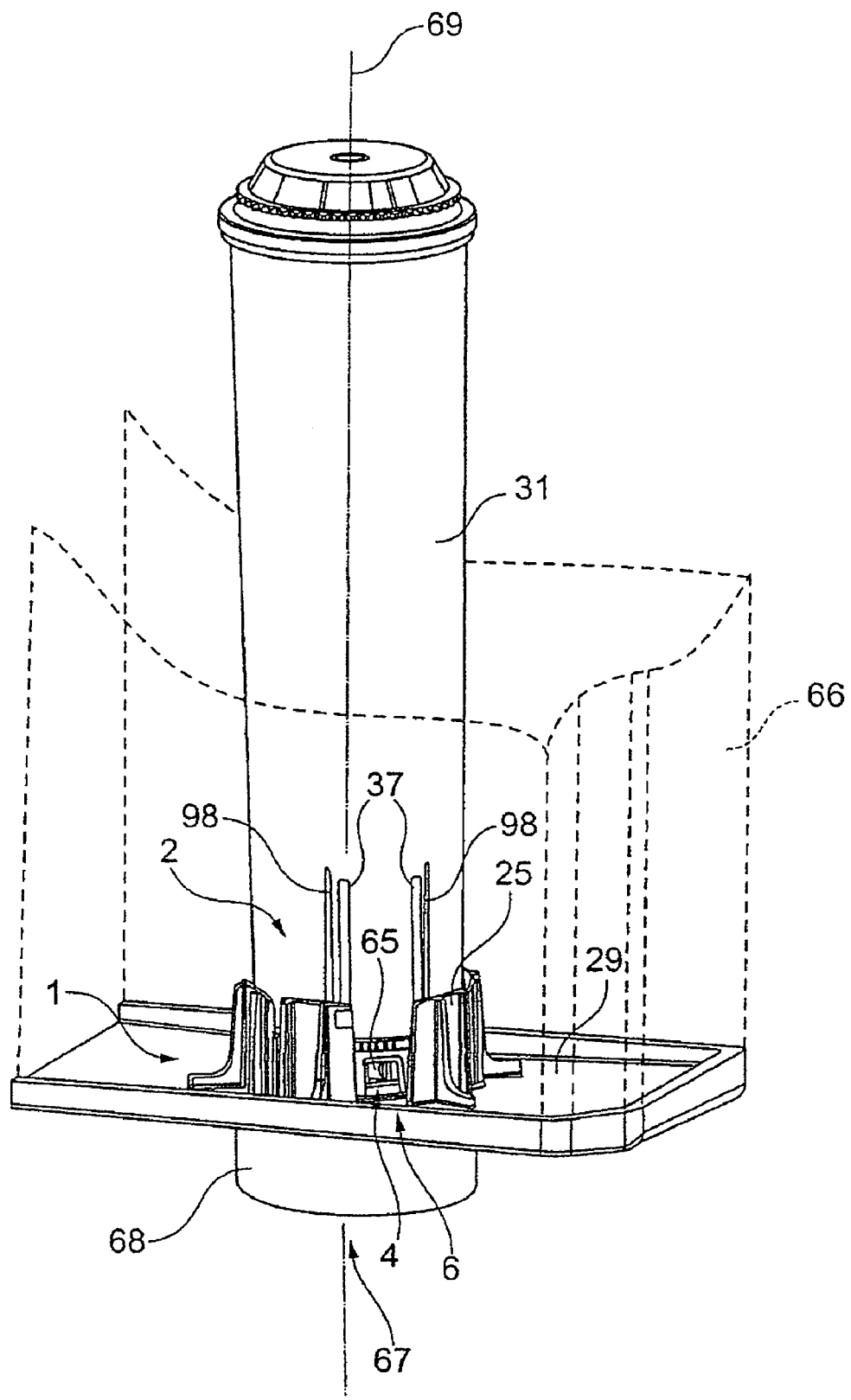

| | | |
|---|---|---|
| 2004/0182777 A1 | 9/2004 | Stankowski |
| 2004/0211931 A1 | 10/2004 | Olson et al. |
| 2007/0289913 A1 | 12/2007 | Namur |

FOREIGN PATENT DOCUMENTS

| | | |
|---|---|---|
| DE | 30 14 493 A1 | 10/1981 |
| DE | 691 05 539 T2 | 8/1991 |
| DE | 196 48 405 A1 | 10/1998 |
| DE | 197 17 054 C2 | 11/1998 |
| DE | 198 27 623 A1 | 1/1999 |
| DE | 198 28 297 A1 | 12/1999 |
| DE | 203 80 258 U1 | 4/2005 |
| DE | 10 2004 026188 A1 | 12/2005 |
| DE | 10 2004 049877 A1 | 4/2006 |
| GB | 2 346 568 A | 8/2000 |
| RU | 2 131 695 C1 | 6/1999 |
| WO | WO 01/80967 A1 | 11/2001 |
| WO | WO 02/13944 A2 | 2/2002 |
| WO | WO 2004/014519 A2 | 2/2004 |
| WO | WO2006/040120 A1 | 4/2006 |
| WO | WO 2006/050114 | 5/2006 |
| WO | WO 2006/050114 A1 | 5/2006 |
| WO | WO 2008/049547 A2 | 5/2008 |

OTHER PUBLICATIONS

U.S. Appl. No. 12/310,071, filed Feb. 10, 2009.
U.S. Appl. No. 12/310,072, filed Feb. 10, 2009.
U.S. Appl. No. 12/312,037, filed Apr. 23, 2009.

* cited by examiner

TANK

CROSS REFERENCE TO RELATED APPLICATIONS

The subject matter of this application is related to the subject matter of U.S. application Ser. No. 12/310,061 filed Feb. 10, 2009;U.S. application Ser. No. 12/310,071 filed Feb. 10, 2009;U.S. application Ser. No. 12/310,072 filed Feb. 10, 2009 and U.S. application Ser. No. 12/310,037 filed Apr. 23, 2009.

BACKGROUND OF THE INVENTION (1). Field Of The Invention

The invention relates to a tank having a filter cartridge for appliances which use water, particularly domestic appliances such as automatic drink machines like automatic coffee machines, drinking water dispensers, cooking and baking appliances, steam appliances such as steam irons, steam cleaners, high pressure cleaners, air cleaners and conditioners or the like where suction is provided on the tank to draw water from the tank using a means for producing a reduced pressure and in which a filter connection is provided for connecting a filter cartridge to the interior of the tank. More particularly the invention pertains to a tank having a specially constructed outlet with a coding structure that accepts correspondingly shaped filters employing a key/lock principle as well as specially constructed filter cartridges and adapter.

(2). Description Of Related Art Including Information Disclosed Under 37 CFR 1.97 and 1.98

In various machines, for example in coffee machines or espresso machines, a water tank is provided in order to hold a liquid, in the case of coffee machines or espresso machines in order to hold water, in which case a filter cartridge can be inserted into the tank in order to prepare the water before processing in the machine. Known filter cartridges have an inlet in the lower area, through which the water is sucked in by the associated machine. In this case, the water is passed over a filter bed and is passed, via a connection of the filter cartridge to a corresponding suction connection of the water tank, into the machine.

For reliable operation of the machine, it is of major importance that a filter cartridge with defined filter parameters is used. An incorrect filter cartridge will result in the machine being supplied with inadequately or incorrectly prepared water, which can lead to negative effects, for example to limescale or the like, or even to machine defects. The machine control system is not able to initiate the intended servicing intervals at the correct time, as when using a filter cartridge of the correct type, if such a filter cartridge is not actually used, however. When using inadequate filter cartridges, problems arise not only in the operational reliability of the machine but also in the question of the guarantee, etc. It is therefore of major importance to ensure that only permissible filter cartridges are ever used.

BRIEF SUMMARY OF THE INVENTION

The invention is therefore based on the object of proposing a tank and a filter cartridge which ensure that only the permissible filter type is used.

A tank according to the invention with a suction connection element for sucking in water by means of reduced pressure from the tank and a filter connection for connection of a filter cartridge in the interior and/or outside the tank is accordingly distinguished in that the filter connection of the tank is provided with at least one mechanical coding structure which comprises at least one axial projection and/or at least one axial recess and fits a complementary coding structure of the filter cartridge, which accordingly comprises at least one recess and/or at least one projection.

The expression a tank-side filter connecting element such as this should be understood according to the invention as meaning elements which are arranged and/or formed directly and/or indirectly on the tank, such as projecting and/or recessed holding and/or fixing and/or coding and/or sealing elements. By way of example, these may be in the form of connecting stubs, which are designed such that they are or can be connected firmly to the tank, hooks, eyes, adapters or the like.

The tank-side filter connection is in this case preferably formed in the bottom area of the tank. However, it may also in any case be arranged internally and/or externally at least partially or else completely in a corner and/or on a side wall of the tank, depending on the point at which the connection is provided between the water tank and an appliance-side outlet-flow line. For example, it is also feasible to use a tank-side filter connecting element which is passed out of the tank at points at a distance upward from the bottom of the tank, in its installation position for use.

Embodiments such as these make it possible, for example, to provide a tank which is in the form of a jug and/or drawer and in which, in turn, only a filter cartridge which is provided with a corresponding, coded filter-side tank connecting element can be used. The appliance-side connection of the tank connection may be connected as a plug connection to a correspondingly complementary appliance-side tank connecting element, both in this embodiment and in the embodiments described above. The tank-side filter connecting element, which is at a distance from the tank bottom, may, for example, also be in the form of a filter connecting element which can be hooked in on a tank wall, for example in the form of a pipeline which, when a cartridge with an appropriately matching coding is inserted, is used to carry out the untreated water with which the tank has been filled, and which is filtered by the filter cartridge.

If the water inlet openings for the filter path are arranged at an appropriately low level, the essential contents of the tank can also be emptied by means of an embodiment such as this, so that the tank does not contain any unusable water, or only a small amount of unusable water, which cannot be passed through the filter path.

The structures on the filter connection of the tank therefore have to interact on the key/lock principle with corresponding connecting structures on a filter cartridge, in order that the filter cartridge can be inserted into the water tank in such a manner that it can operate. A machine manufacturer or tank manufacturer can in this way ensure that the only filter cartridges which are used are those which ensure reliable operation of a specifically associated machine. By way of example, the reduced pressure for sucking out can be produced by means of a suction pump.

In addition to such axial projections and/or recesses, coding elements can also be provided in the radial direction of the filter connecting element and/or of the filter cartridge.

In one particularly advantageous embodiment of the invention, the filter connection of the tank and a connecting stub of the filter cartridge are designed such that they at least partially surround one another. For example, in particular, in an embodiment such as this it is also possible to arrange coding structures in the radial direction, that is to say transversely with respect to the axis of the connecting stub of the filter cartridge that is being used, in order to complement axially aligned coding structures, for example for further differentiation of the coding structure, such as for different applications and/or customers. This can be combined without any problems with widely differing axial coding structures, for example on the end face of the connecting stub or in the area of the tank bottom.

The coding structures are preferably at least partially designed at the same time as fixing elements for attachment of the filter cartridge. In this case, the coding structures are preferably designed with an undercutting form, for example such that the filter cartridge can be fixed on the tank bottom or to an attachment element which is fitted to the tank bottom, by rotation or clipping, in which case, of course, the corresponding coding structures must match one another in order to ensure correct operation with the correct filter cartridge.

In one particularly simple embodiment, the coding structures may also be in the form of a bayonet fitting. For this purpose, projections which preferably run transversely with respect to the axis of the filter connecting element are provided on the filter connection of the tank and/or on the tank connection of the filter cartridge, corresponding to holding and/or guide webs, which correspond thereto, on the tank connection of the filter cartridge and/or on the filter connection of the tank.

However, by way of example, it is also possible to provide double bayonet fittings or multiple bayonet fittings, in which case this double or multiple structure may relate not only in plan view to the circumferential surface of a corresponding connecting element but also to its longitudinal extent. In this case, angle arrangements at different spacings can also be provided, in a plan view of the circumferential surface, between individual, and/or a plurality of, double or multiple bayonet fitting elements. This allows coding to be achieved for differently designed bayonet fitting structures which corresponds to the respectively formed complementary bayonet fitting elements, in which case a bayonet connection can be provided completely in a first, a second or else a further plane in each case, or else it could be made impossible for a bayonet fitting element which is provided on an incorrectly coded filter cartridge to pass through, thus preventing use of this cartridge for operation.

For example, in principle, reliable mechanical coding can be created for an entire cartridge family by the spatial arrangement of projections and holding or guide contours, particularly with a combination of axial and radial elements, in which case, for example, only individual structure elements of the coding make it possible to use one or possibly also a plurality of correct filter cartridges from this family to be used for operation, or to prevent this. Different arrangements and shapes may, however, also be provided, by way of example, for coding of different filter types with different machines.

Radially projecting projections, for example projections like vanes, on the cartridge can, furthermore, offer the supplementary advantage of broader guidance. Furthermore, an embodiment such as this allows easy insertion into corresponding guide paths in the tank fitting, since the projections or vanes on the cartridge can be seen well by an operator during insertion, thus also allowing at least rough prepositioning or filter alignment for its use.

Furthermore, these radial projections result in an increase in the circumference of the cartridge in the area of the attachment, thus improving the robustness of the anchorage.

Furthermore, projections or vanes such as these on the filter cartridge can be manufactured from material which is more elastic than the material of the tank fitting, thus allowing the filter cartridge to be braced better in the axial direction by means of a spring-like effect.

Fundamentally, the embodiment in the form of a bayonet fitting in conjunction with an axial seal, which is pressed against a tank-side seal in the axial direction, is advantageous. The bayonet fitting offers a corresponding tightening torque in the axial direction, while the axial seal offers corresponding advantages during insertion. For example, there is no need to overcome any friction forces whatsoever for pressing on and releasing an axial seal during insertion and removal of a filter cartridge.

The features mentioned above of a bayonet fitting with radially projecting projections or vanes on the filter cartridge offer the stated advantages in particular in conjunction with an axial seal. The corresponding projections and guide paths of the bayonet fitting can in this case be used, as before, as a supplementary coding structure.

In principle, coding structures can also be used as operating members in the area of the tank connection. For example, a switching mechanism that is fitted to the tank can thus be operated by the coding structures of the filter cartridge, which switching mechanism can be used by the associated appliance in order to signal that the filter cartridge is seated correctly and/or to identify the correct type of cartridge. In principle, a configuration of the coding elements such as this as an operating member is also possible with all other types of coding structures.

Further differentiation between the coding structures can be achieved, for example, by means of a combination of different shapes of the circumference of the tank-side filter connection. For example, additional coding can thus be provided by a deviation from the previous circular cross-sectional shapes of corresponding connecting elements. For example, an oval shape of the tank-side filter connection can be used to ensure that only a filter cartridge which appropriately fits the coding structures can be used even in the case of axial and possibly also radial coding structures which otherwise match for use of that filter cartridge.

In one development of this embodiment, the filter connection of the tank can also be provided with a circumferential contour in the form of a polygon train. A shape such as this with appropriate structuring of the axial, and if used also radial, coding structures furthermore allows more extensive angle coding for different usage angle positions of the filter cartridge.

A rotationally symmetrical circumferential contour is preferably provided on the filter connecting element for this purpose. A rotationally symmetrical configuration makes it possible to provide different, predetermined angular positions for use of a filter cartridge, with which positions an additional function can be associated, if required, depending on the angular position. By way of example, one example of a circumferential shape of the tank-side filter connecting element according to the exemplary embodiments described above will be provided by a hexagonal cross-sectional contour. A contour such as this allows, for example, six different angular positions for a filter cartridge corresponding to it. A corresponding situation applies to quadrilateral, hexagonal, octagonal or similar structures.

In this case, the tank-side filter connecting element may be in the form of a recess with a corresponding internal circumference and/or external circumference or else may be in the form of a projection with a corresponding external circumference and/or internal circumference. A connecting stub can be provided in a corresponding manner with the corresponding circumferential contour, either on the internal circumference and/or on the external circumference, both for plugging in and for plugging on a corresponding connecting element of the filter cartridge.

The circumferential surface formed in this way is advantageously in the form of a sealing surface at the same time. The seal can therefore advantageously be produced, for example sprayed on, from the same material as the cartridge housing. This ensures that only a filter cartridge with a seal of the corresponding shape thereto for the filter outlet line can be inserted into the tank and can be connected to the tank-side filter connecting element in such a way that it can operate.

A circumferential surface which is shaped as described above can also be used as a holder for the filter cartridge, corresponding to a correspondingly shaped holding element in the tank area. The circumferential surface also provides a coding structure in this case.

Particularly when the coding structure forms the sealing surface at the same time, it may have a cross-sectional taper which extends in the axial direction, for example in the form of a truncated cone or pyramid. This allows it to be plugged on in a simpler, sealed manner, without relatively major friction forces.

As has already been mentioned a number of times, the corresponding coding structures, which correspond to the tank-side coding structures, must be provided on the filter cartridge side. If the sealing surface of the tank-side filter connection is included in the shape of the coding structures, then, in one particular embodiment, the seal itself is provided with the appropriate shape, as the filter-side tank connecting element. For example, if the tank-side filter connecting element has a hexagonal cross section, this makes it possible to provide an appropriately hexagonal seal as the mating piece. In this case, this may be in the form of an axial seal and/or a radial seal, which is either plugged into a correspondingly shaped hexagonal recess in the above exemplary embodiment, or else is plugged onto a projection that is shaped in the same way.

As stated above, in the case of a tapering cross section, the seal is also preferably appropriately adapted in this case such that it merges over an area when plugged onto a projection which, for example, is in the form of a truncated hexagonal pyramid.

In this refinement, only a filter cartridge with an appropriately shaped seal can be used in such a way that it can operate.

In one particular embodiment, fixing means are provided which project from the bottom of the tank, act on the external circumference of the filter cartridge and can additionally have a coding characteristic. One example of a fixing is the latching or clipping of the filter cartridge into corresponding latching or clip elements which, if required, may likewise be in the form of a coding structure.

Furthermore, a blending setting can advantageously be provided, by means of which a bypass flow of unfiltered water, or water which has been prepared in some other way, bypasses the filter bed, in which case the amount of unfiltered water or water which has been prepared in some other way can be adjusted. This is possible, for example, by means of one or more bypass openings which are opened in a variably adjustable manner in order to set the amount of water that bypasses the filter bed. A blending setting such as this can be provided, for example, via the angular position of the installation position of the filter cartridge. In this case, the combination of the coding structure with the presetting of fixed angular positions via the installation position is particularly advantageous. The corresponding statements as made above also apply here to the axial coding structures.

The amount of unfiltered water or water which has been prepared in some other way that is blended can in this case be provided by appropriately designed openings which directly connect the tank interior to the outlet flow from the tank. Depending on the angle at which the filter cartridge is inserted, these openings may be of different sizes or may be opened to different extents and/or a different number of them may be opened, thus resulting in a different blending ratio depending on the installation position of the filter cartridge.

For example, when the coding structure in the connecting area of the filter cartridge is hexagonal, openings of different sizes can be provided as a bypass in the tank-side connecting stub, which is provided for connection to the filter cartridge, and these openings are closed as a function of the angle when a filter cartridge is plugged on. The bypass openings are in this case preferably fitted in the sealing surface in such a way that all the openings with the exception of the opening which is intended to be used as the bypass opening are sealed by an appropriately shaped connecting seal of the filter cartridge, on insertion of the filter cartridge.

The blending amount can also be set in a different manner using the coding structure. For example, a coding structure can also be used at the same time as a mechanical driver in order to mechanically operate a blending element in the tank area by means of the filter cartridge. If the connecting fitting in the tank area is hexagonal, for example, a corresponding hexagonal contour on the filter cartridge could be used in order to rotate a rotatable fitting element in order to adjust the blending amount. The hexagonal coding structure of the filter cartridge would then not only have a coding function but at the same time would also be a mechanical operating element, to a certain extent in the form of a hexagonal key.

A further coding option for the tank/filter connection is to vary the alignment of the longitudinal axis, which runs through the filter-side tank connecting element, with respect to a longitudinal axis which runs through the filter housing, such that they form a specific angle, in particular an acute angle, for example, with respect to one another. For this purpose, the filter-side tank connecting element can be designed such that it is preferably slightly bent with respect to the cartridge housing. Cartridges which do not have a connecting element whose position is aligned bent in this way cannot be used in a correspondingly narrow water tank such that they can operate. A further advantage of coding such as this is that this also makes it possible to fit curved and/or bent water tanks with a comparatively large longitudinal extent in an operationally safe and reliable manner since the bending of the two longitudinal axes with respect to one another makes it possible to provide a correspondingly reliably sealing and fixing tank filter holder by optimum alignment of the tank-side filter connecting element in the tank and an insertion movement which is not a vertical insertion movement for the angled cartridge.

If required, further guide elements can be provided for this purpose on the filter cartridge, and/or on the tank, for reliable connection of the tank-side filter connecting element to the filter-side tank connecting element. By way of example, ribs which are provided on the tank side and form a tapering cross section in the insertion direction are particularly highly suitable for this purpose, by means of which ribs the filter-side connecting element and/or the filter housing and/or a guide structure which projects from the filter housing, such as a connecting ring or the like, provide guidance during insertion of the filter cartridge. A filter-side guide structure such as this may be in the form of a circumferential surface which can also have contours, in the form of slots in a complementary form to the ribs described above, and/or some other suitable structure.

In the case of rib/slot coding, a further coding option is in turn possible by different angle coding, when seen in a plan view, for one or more such complementary elements. A corresponding filter cartridge can be inserted for operation only when the slot/rib combination and the angled tank filter connecting structure fit together.

This guide and coding structure described here can, however, also always be used for filter connecting elements which are not angled, but operate in the same way.

An additional guidance and/or coding function can be achieved by projecting points or recesses which are formed at the end on the filter cartridge and can engage in correspondingly complementarily shaped tank-side coding and/or guidance structures.

In order to ensure that the coding according to the invention cannot be circumvented by replacing the tank in a machine with a tank which is not permitted and has no coding structures, for use of filter cartridges which are not permitted, it is recommended that the interface between the tank and the machine likewise be provided with coding structures which may be the same as one of the exemplary embodiments described above. In this case, the machine-side and the tank-side connecting elements must be appropriately coded.

The invention also covers embodiments which provide the connection of the filter cartridge via separate adapter parts which can be connected to the filter cartridge or to the tank. This also applies to the connection between the tank and the associated appliance.

The invention can be used advantageously with all appliances which use water, in particular with domestic appliances which use water or appliances for preparation of foodstuffs and/or drinks, such as automatic drinks machines, in particular automatic coffee machines, drinking water dispensers, cooking and baking appliances, steam and/or high-pressure cleaners, air cleaners and conditioners or the like, which have a corresponding water tank.

BRIEF DESCRIPTION OF THE SEVERAL VIEW OF THE DRAWING(S)

Figure 2:
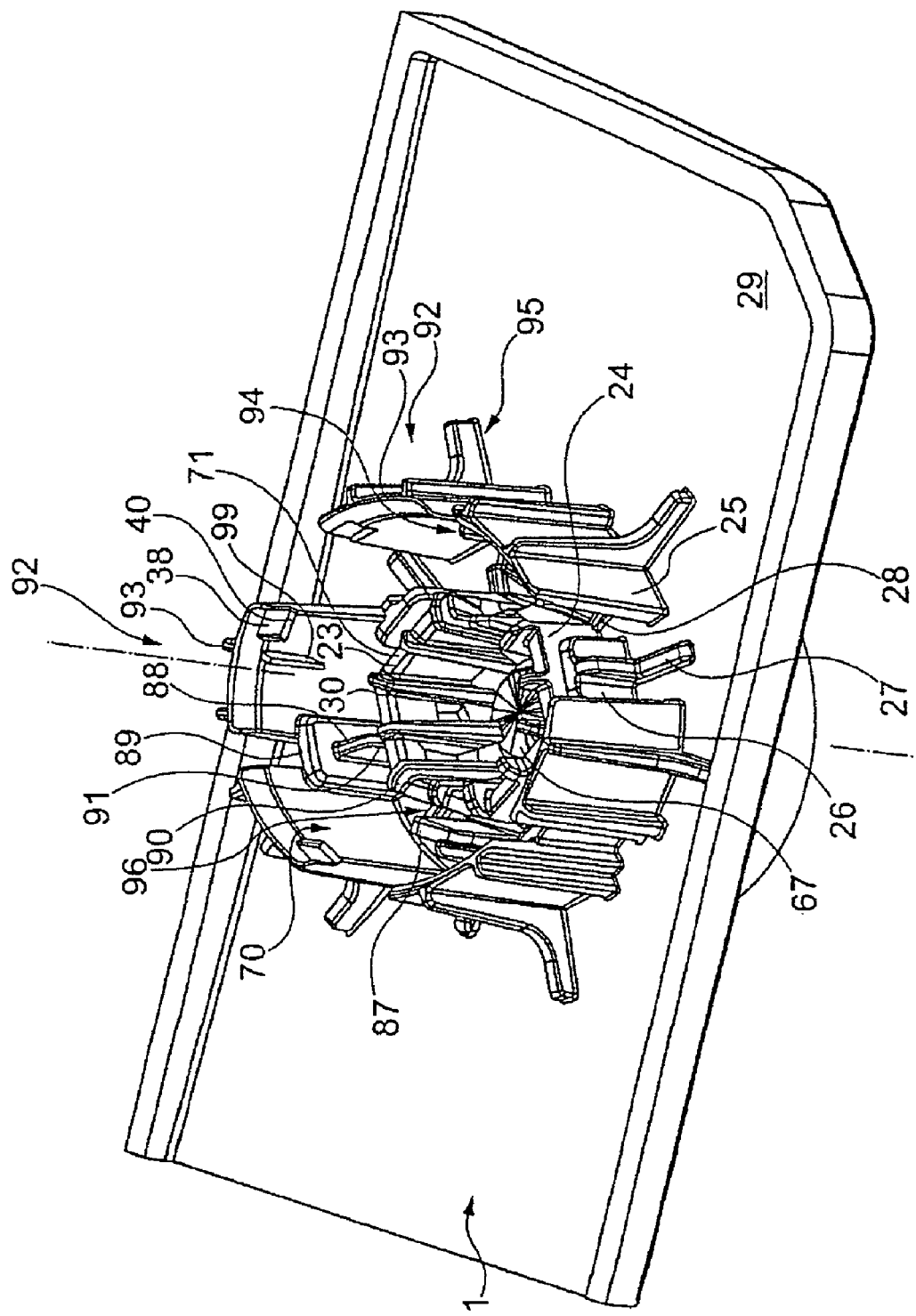
Figure 3:
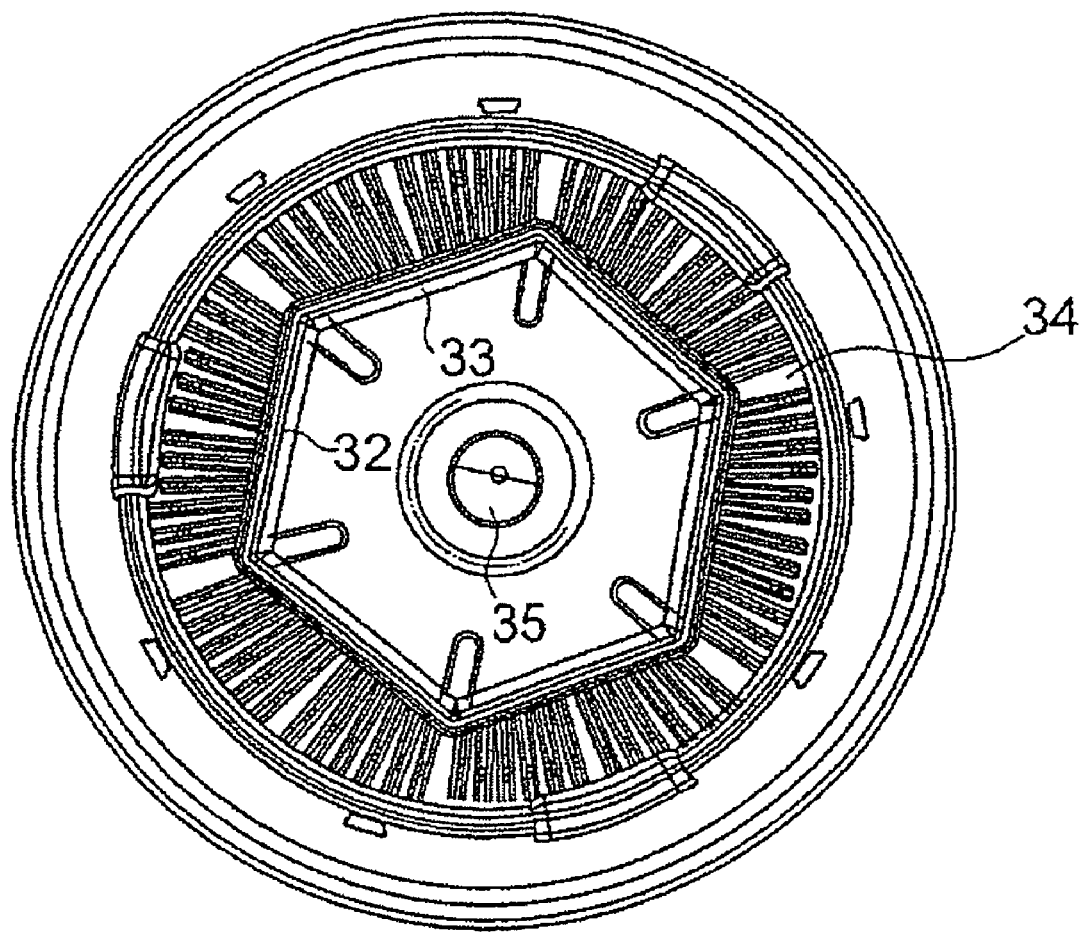
Figure 4:
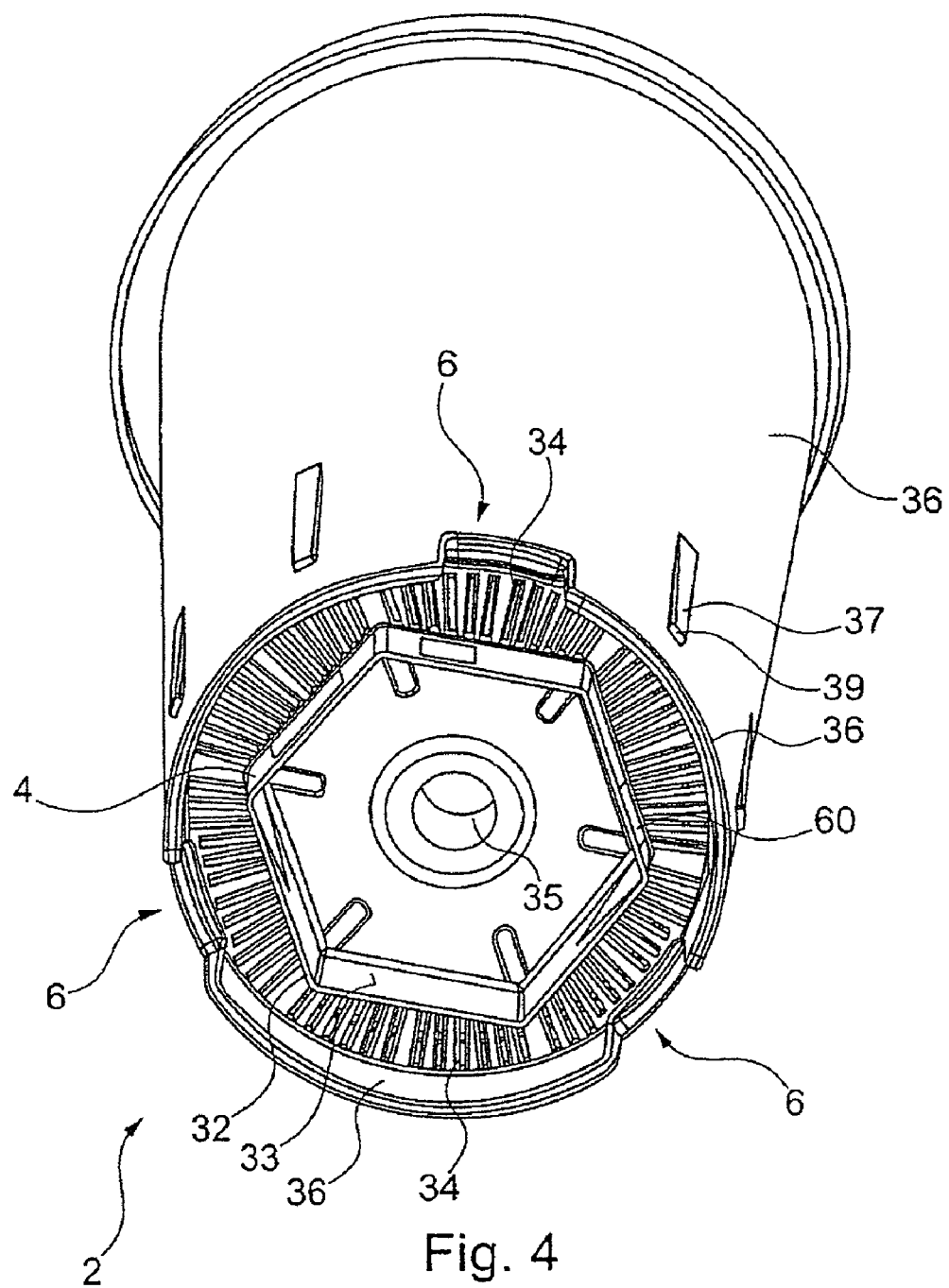
Figure 5:
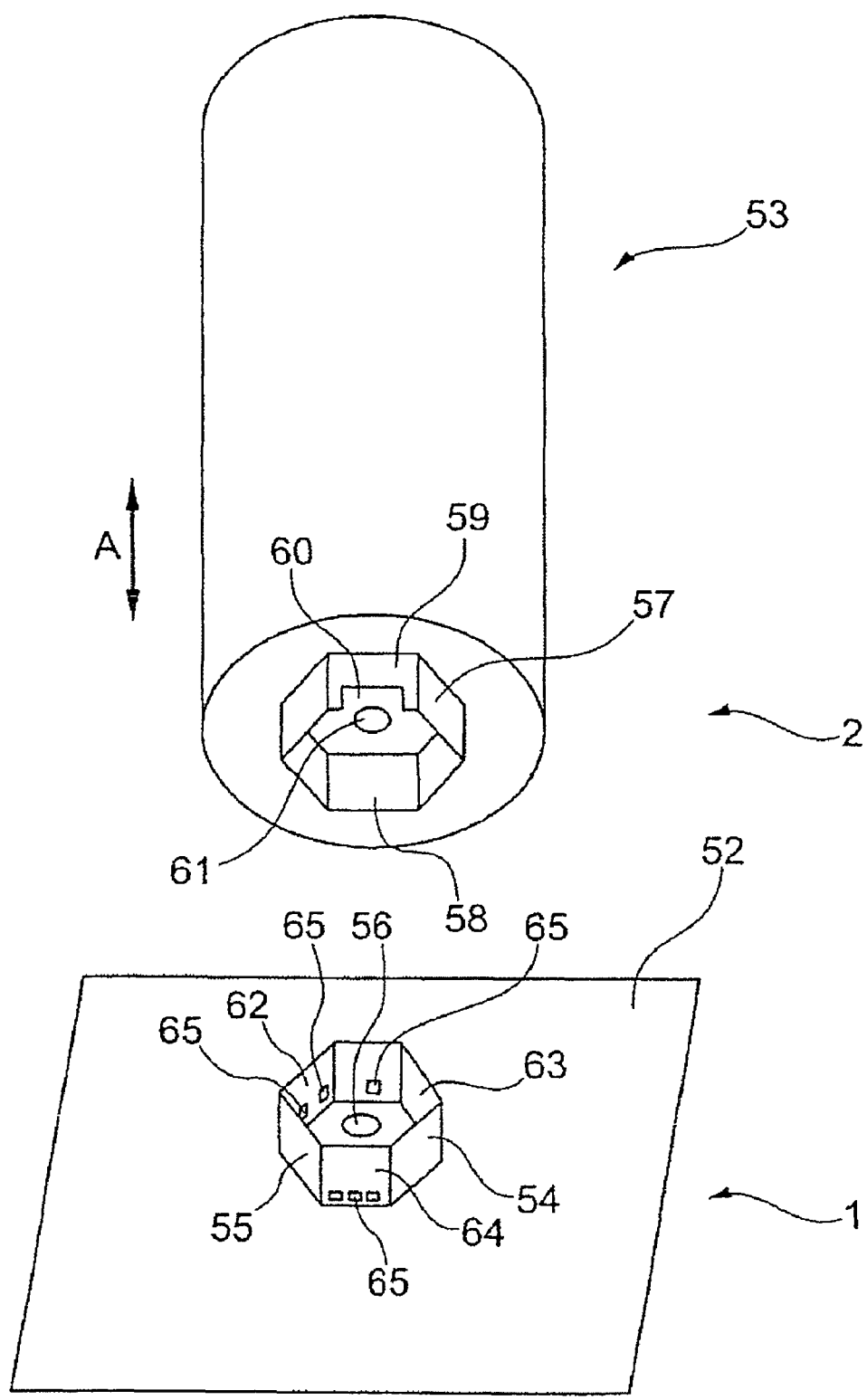
Figure 6:
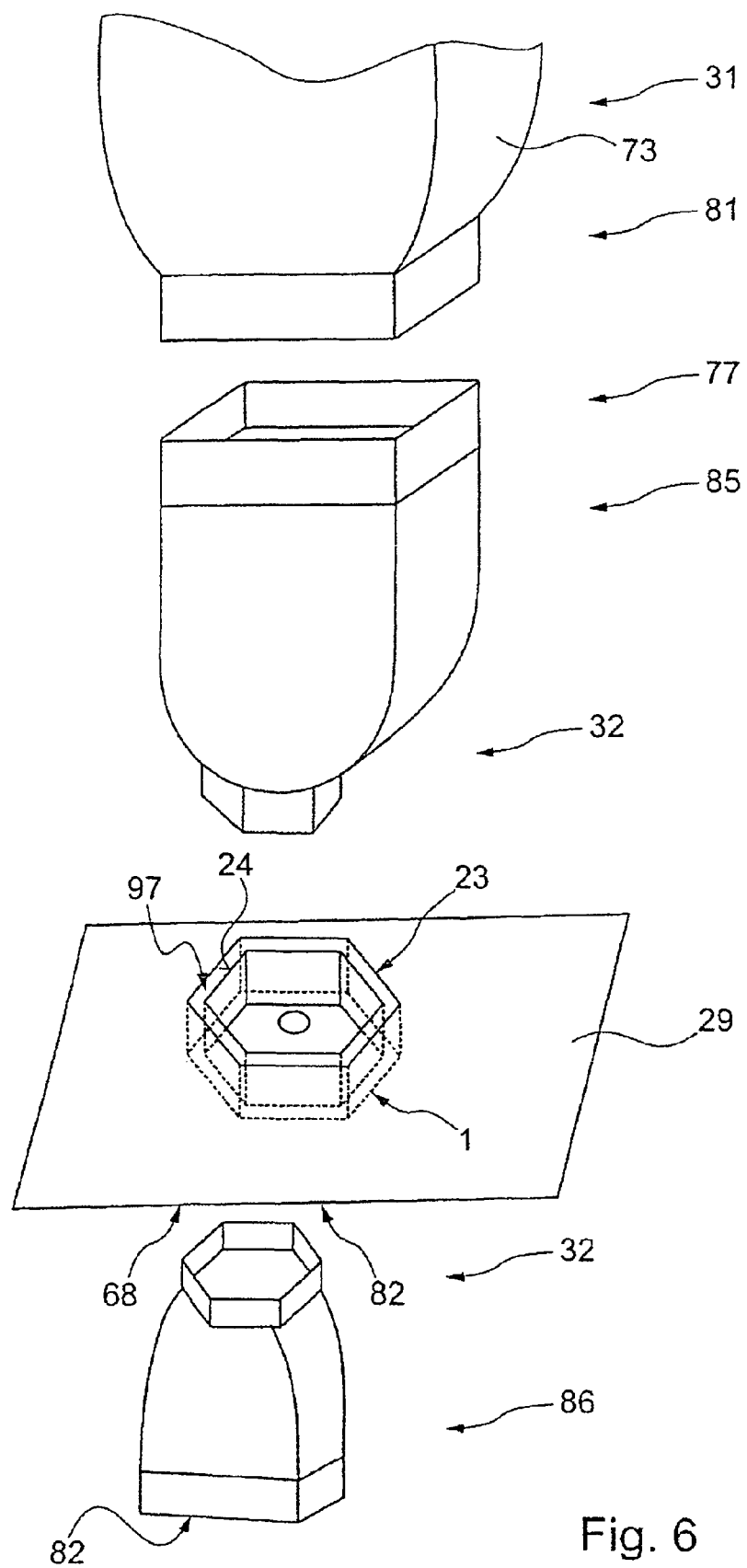
Figure 7:
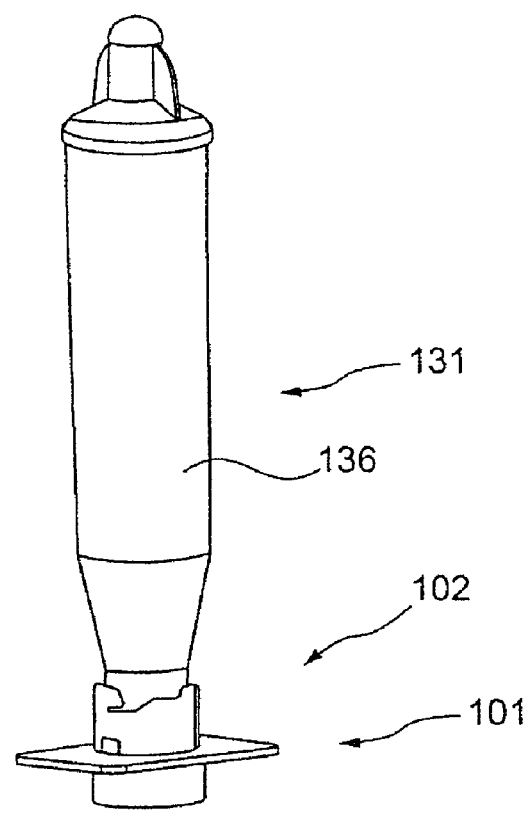
Figure 8:
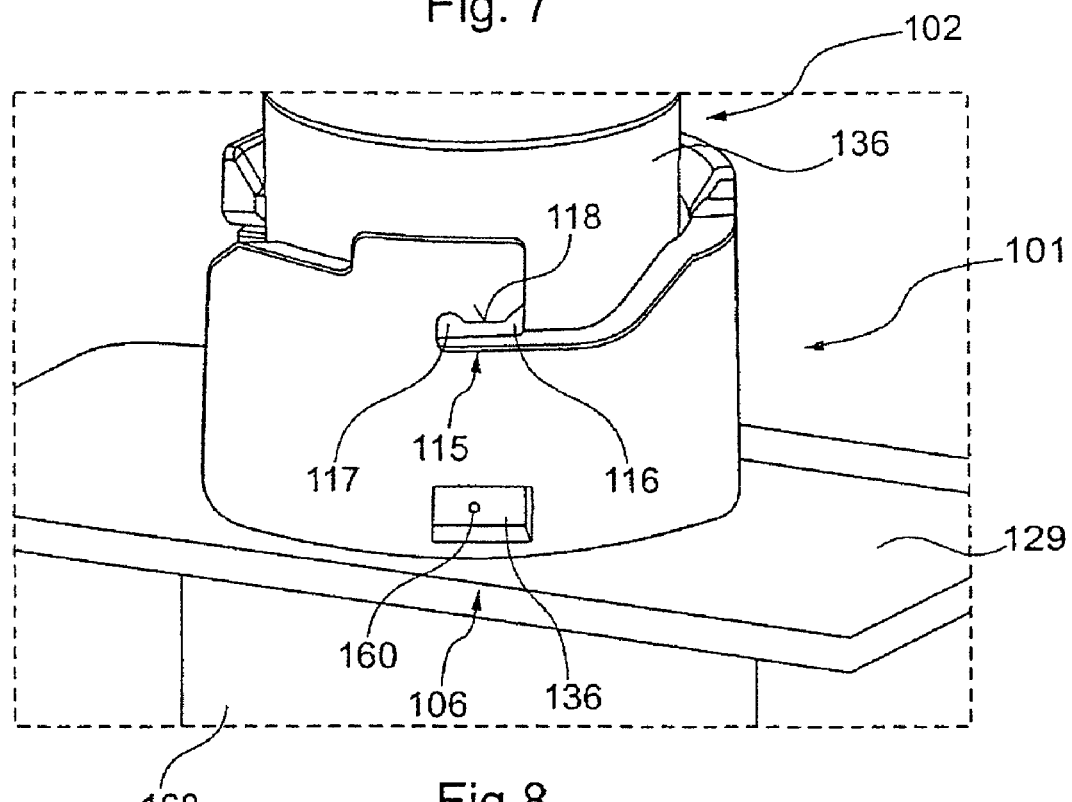
Figure 62:
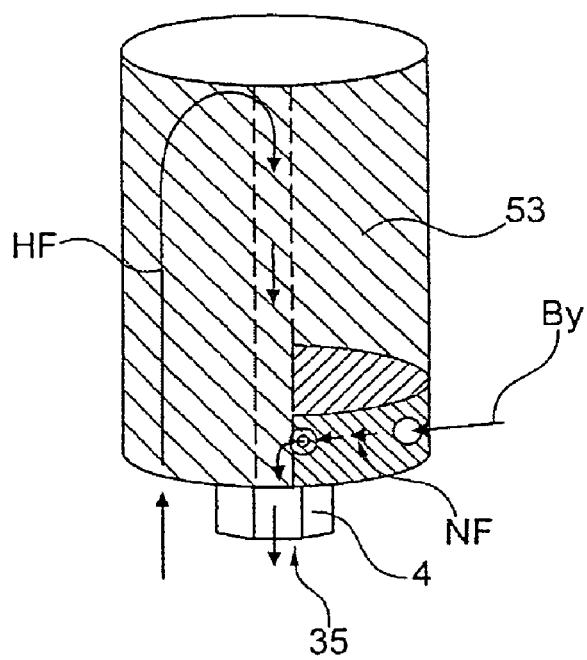

Various exemplary embodiments of the invention are illustrated in the drawing, and will be explained in more detail in the following text with reference to the figures in which, in detail:

FIG. 1 shows a side view of a bottom detail of a water tank with a filter cartridge inserted, FIG. 2 shows a plan view of a bottom detail of a water tank as shown in FIG. 1, FIG. 3 shows a plan view of the tank connecting element of a filter cartridge as shown in FIG. 1, FIG. 4 shows a perspective illustration of a filter cartridge as shown in FIG. 1, FIG. 5 shows an embodiment variant with angle-dependent blending amount setting, FIG. 6 shows, by way of example and schematically, a filter-side and an appliance-side tank connection, in each case in combination with an appropriately designed adapter piece, and FIGS. 7-62 show further possible embodiments, in the form of various views, by way of example and schematically.

DETAILED DESCRIPTION OF THE INVENTION INCLUDING BEST MODE

FIG. 1 shows connecting elements 1, 2 of a tank 66, which is illustrated schematically in the form of a detail by dashed lines, and of an associated filter cartridge 31. On the tank side, a connecting fitting 1 is illustrated, which is firmly connected, for example welded, adhesively bonded or attached in some other way, to the bottom 29 of the associated tank 66. The tank connecting element 2 of the filter cartridge 31 is inserted into this connecting fitting 1. The filter-side tank connecting element 2 can be seen better in FIG. 4 and comprises a connecting stub 4 which merges into the cartridge housing 36. In the embodiment variant shown in FIGS. 1 and 4, the water is passed via side slots 6 and then via aperture openings 34, which are arranged at the bottom of the cartridge, into the interior of the cartridge housing 36, and then passes through a filter bed, which is not illustrated in any more detail. The filter path may in this case be in the form of an upward flow, a downward flow, or a combination with both flow guidance processes. The filtered water is in the end passed through the central outlet-flow tube 35, via the tank-side appliance connection 68 into the suction connection 67 of the water tank 66.

Details which are significant to the invention are explained by way of example in more detail as follows with reference to FIGS. 1 and 2. In order to ensure that only filter cartridges 31 which are provided correctly for the respective application can be inserted into the water tank 66, the tank-side filter connection 1 has coding structures which are aligned axially with respect to a longitudinal axis 69 which runs through the tank/filter connection. These coding structures may be in the form of axially aligned projections, as is illustrated here by way of example by projections 87 to 95 and 99, as can be seen particularly well in FIG. 2. However, they may also be in the form of axial recesses, as likewise illustrated here by way of example and not exclusively as recesses corresponding to the items 96 to 98 as illustrated in FIGS. 1-6.

These axially aligned coding structures of the tank-side filter connection 1 or of a correspondingly coded filter-side tank connection 2 are intended to prevent manipulations on the basis of filter cartridges which the manufacture does not intend to be for use. Appropriately complementary coding structures of projections and recesses on the tank-side and filter-side connections 1 and 2 make it possible to ensure that only filter cartridges which are intended for the respective application can be inserted into the water tank such that they can be operated, possibly also using an appropriate intermediate piece, for example in the form of an adapter, which must then itself have the correspondingly complementary coding structure, such that the required key/lock combination can lead to a filter cartridge which has been inserted into the tank such that it can operate.

The axial projections 87 to 95 and 99, which are illustrated by way of example, are used to ensure that only a filter-side tank connection of a filter cartridge corresponding to the hexagonal shape shown in FIGS. 1 to 6 here can be connected in a sealing manner to the tank-side, hexagonal filter connection 1. A different sealing option, in particular without a sealing element, with complementary axially aligned coding structures mapped thereon, is therefore not possible. In this example, the seal is formed on the sealing surface 24, which is formed on the tank-side connecting fitting 23, in conjunction with the filter-side sealing surface 33, which is itself formed on the filter-side tank connection in the form of the molded seal 32. The axial recess 96 between the tank-side connecting fitting 23 and these axial projections 87, which are arranged at least partially surrounding it, is designed to be sufficiently narrow that only a coding element in the form of a hexagonal, axial projection, as is formed by the molded seal 32, can be inserted in a sealing manner, and preferably a fixing manner as well.

In order to prevent it from being possible to fit a filter-side tank connection which does not use this axial recess 96 at the top in a sealing manner to the tank-side filter connection 1, axial projections 90, 91 which project at the end are formed, for example, on the end upper edge of the connecting fitting 23. These prevent a seal without axial coding structures from being fitted in a sealing manner, in this case in the form of axial recesses, or else possibly axial projections, depending on how the ratio is chosen between the remaining surface area of the end rim 71 and the axial projections 90 and 91. Instead of the formation of appropriately axial projections 90, 91, it is also possible in an embodiment which differs from this to provide a recess with an axial function such that, once again, no sealing contact is possible without a complementary axial projection. However, this has not been illustrated here, for clarity reasons.

In order additionally to make it possible to prevent the sealing with respect to the filter-side tank connection outside the axial recess 96 which is intended to hold the filter-side connecting stub 32 in the form of the molded seal 32, further axial projections and recesses are illustrated here once again, and once again by way of example and schematically. In addition, these may also particularly advantageously have fixing elements for the filter cartridge to be inserted, or may be in the form of such fixing elements. A corresponding fixing element in the form of a snap-action element 37 is formed for this purpose on the filter cartridge housing 36 and axial recesses 38 which are formed complementarily thereto on the tank-side filter housing will be described, purely by way of example. By means of a radially greater extent in the internal touching area of this connecting structure than by comparison in the outer end touching area with respect to the tank-side connecting fitting, these two elements can also represent fixing elements which slide one inside the other, overcoming a certain contact-pressure force, on insertion of the cartridge into the tank connection, with a so-called snap-action effect, until the two end faces 39 and 40 stop rest on one another and the filter cartridge is fixed.

A further possible axially aligned coding structure is illustrated, once again schematically and by way of example, based on the projection/recess connection 98, 99 illustrated adjacent thereto. For this purpose, a further axial projection 99 is illustrated on the inside of the outer shell 25, which is also referred to as the axial projection 92, which further axial projection 99 requires the provision of a correspondingly complementary axial recess 98 on the filter cartridge 31 in order to allow the insertion of an appropriate cartridge.

The six outer shell elements 25, which are once again likewise illustrated by way of example here, themselves represent axial projections 92, whose outsides have additional axial projections 93, once again in order to prevent a sealing contact.

At the bottom, in the direction of the tank bottom 29, these axial projections also extend in the radial direction and are additionally identified by the item number 95. Despite this radial extent, these are, however, also axial coding structures which once again reliably prevent a seal without axially coded structures from making contact. In one particularly preferred embodiment, an axial projection structure such as this, which for example is also referred to as a bottom rib, can be formed at least on one side of the tank as far as its wall, in order to reliably prevent a bottom connecting sealing, without an axially aligned coding structure.

As has partially already been referred to above, one or more of the elements, which are illustrated here as axial projections, in particular the bottom ribs 27 and axial projection 95, may also be formed in a complementary structure as axial recesses, once again making it possible to prevent sealing without an axial coding structure.

A tank-side appliance connection 68 is illustrated, just by way of example, as a round connecting stub, for simplicity reasons. Like the connecting fitting 1 of the tank-side filter connection, the tank-side appliance connection 68 may, however, also have coding structures in order to ensure that only permissible connections can be produced, that is to say both with a filter cartridge to be used for the tank and, if desired, with an appliance which is suitable for use of this tank. For the sake of clarity, such details for the appliance connection 68 are not illustrated graphically and, with regard to the embodiments of codings which are possible for this purpose, reference is made to the embodiments described with respect to the tank/filter connection, which are also completely applicable to the tank/appliance connection.

A further and/or additionally possible embodiment of a tank-side filter cartridge coding is shown in FIGS. 2 and 5 as a tank-side filter connecting element whose circumferential sealing surface 24 connects with a corresponding filter side sealing surface 33 having a coding structure, which is aligned axially with respect to the filter connecting stub 4 which only for the purposes of illustration is disposed on a coding element having a polygonal cross section. In this specific exemplary embodiment, the polygon is hexagonal, with this being representative of a multiplicity of other possible embodiments of tank/filter connections having other non circular cross sections.

Further details relating to coding which is possible in this way between a tank-side filter connecting element 1 and a filter-side tank connecting element 2 will be described in the following text, once again with reference to FIG. 2. The tank-side filter connecting element 23, which in this case by way of example is in the form of a hexagon, and which is in the form of a connecting fitting 23, is formed, in order to produce its polygonal contour, as an axial projection 23 with a polygonal external circumference having a sealing surface 24 and a correspondingly polygonal internal circumference. After the filter cartridge has been plugged on, the complementary cartridge connecting structure preferably rests with its internal circumference and sealing surface 33 (FIG. 4), in an interlocking and sealing manner in a first possible attachment form, on the external circumference sealing surface 24 such that it fixes and seals the filter cartridge 31.

In this case, the tank-side filter connecting fitting 23 and the connecting stub 4 of the filter cartridge can preferably at least partially surround one another. If they surround one another completely, as well as the additional stabilizing effect of the circumferential touching surfaces between these two axially structured elements, this also ensures correct sealing over a large area between the fresh-water side in the interior of the tank 66 and that side of the filter apparatus, which is located adjacent to the connecting opening 35, for the appliance supply via the suction connection 67.

In a complementary embodiment corresponding to FIG. 6, in a reversal of this design, the tank-side filter connecting element 23 may be in the form of a complementary structure in the form of an axial recess with a corresponding internal circumference on which, once again, the sealing surface 33 for the filter cartridge can rest, preferably in an interlocking manner and over an area, forming a seal, once again at the same time in this way ensuring that the filter cartridge 31 is adequately fixed to the tank 66.

Further details relating to the coding of the tank/filter connection for the embodiment in the form of an axial projection or projections on tank connecting fitting 23 will now be described, once again with reference to FIG. 2. However, these statements also apply in the same sense to a filter connection in the form of the axial recess in a tank connecting fitting 23, as described above, corresponding to FIG. 6. Because of this relationship, the same reference symbols are therefore also used for the respective features whose sense is the same, for both embodiments.

The tank-side connecting fitting 23 (FIG. 2) has a hexagonal external contour whose circumferential outer surface forms a sealing surface 24. Outer shells 25, which point in the direction of a filter cartridge 31 to be inserted and are aligned approximately parallel to a longitudinal axis 69 which runs through the connection, are arranged externally around the fitting 23 and are suitable for at least partially surrounding a filter cartridge housing, or its connecting area, on the outside.

Blocking elements 26 are fitted in the intermediate area 70 between the connecting fitting 23 and the outer shells 25 and ensure that only a narrow seal, which fits onto the sealing surface 24, can be inserted into the area of the connecting fitting 23.

As has already been partially described, bottom ribs 27, 28 prevent sealing with respect to the tank bottom 29, in the same way that inner ribs 30 prevent sealing by means of an inner radial seal. The bottom ribs are preferably arranged close to the bottom, aligned radially and/or tangentially with respect to the connecting stub 23. The inner ribs 30 project inwards and/or upwards beyond an upper rim 71 of the connecting fitting 23. These structures result in only the sealing surface 24 being accessible as a sealing surface, thus resulting in a coding structure according to the invention by virtue of the hexagonal external contour, that is illustrated here by way of example, of the sealing surface 24.

The filter cartridge 31 that is used is provided with a molded seal 32, which correspondingly likewise has a hexagonal cross section (see FIG. 3). The inner surface of the molded seal 32 in this case forms the sealing surface 33.

Furthermore, FIG. 3 shows the inlet slots 34 for supplying water into the filter cartridge, as well as a central outlet-flow opening 35 out of which water flows.

Via the molded seal 32 with correspondingly shaped connecting fitting 23, the illustrated embodiment also comprises further coding structures. Snap-action elements 37 (cf. FIG. 4), for example, are integrally formed externally on the filter cartridge housing 36. The snap-action elements 37 can be inserted into corresponding receptacles 38 of the outer shell 25. A pressure point results when the lower edge 39 is fitted to the stop 40 of the receptacles 38. The filter cartridge 31 can easily be inserted as far as this position, without any opposing resistance, in the correct angular position. In this angular position, the molded seal 32 is located such that it is aligned with respect to the sealing surface 24 of the connecting fitting 23, such that it can be inserted further in the axial direction. By being pushed further in in the axial direction, the snap-action element 37 snaps over the stop 40, with the molded seal 32 being pushed in along the sealing surface 24. The filter cartridge 31 is fixed in the outer shells 25 by the incline on the snap-action elements 37 and the corresponding internal shape of the outer shells 25. There is no longer any need for any further axial fixing elements in this embodiment.

FIG. 5 shows a schematic illustrated embodiment with a blending amount which can be adjusted as a function of the angle. The tank bottom 52 is illustrated only in the form of a detail in the connecting area of the filter cartridge 53. The tank bottom 52 comprises a hexagonal connecting fitting 54, which converges slightly upwards, in the form of a truncated pyramid, in order to improve the sealing effect, with respect to a purely vertical alignment of the fitting walls and/or as a further coding structure. This cross-sectional taper can scarcely be seen in the perspective illustration.

The outer surfaces 55 of the connecting fitting are at the same time also used as a sealing surface in order to seal the outlet-flow line 56 entirely or partially with respect to the interior of the tank, when the filter cartridge 53 is fitted.

The filter cartridge 53 has a hexagonal seal 57, which is coded corresponding to the connecting fitting 54. The individual walls 58 have an equal length in the axial direction A, with the exception of one wall 59. The wall 59 is provided with a cutout 60 on the underneath, the function of which will be explained in more detail in the following text. The outlet 61 from the filter cartridge 53, through which the filtered water enters the outlet-flow line 56, can be seen in the interior of the seal 57.

Different fitting walls 62, 63, 64 of the connecting fitting 54 are provided with a different number of bypass openings 65. The bypass openings 65 are arranged such that they are closed to form a seal by the relatively long sealing walls 58, when the filter cartridge 53 is plugged on. The bypass openings 65 can remain open only where the wall 59 with the cutout 60 is used, so that filtered water passes directly via the cutout 60 from the tank to the area of the outlet-flow line 56.

As can be seen without any difficulty from the illustrated exemplary embodiment, the size of the free cross section of the bypass openings 65 is adjusted by the angle arrangement of the filter cartridge, that is to say by the choice of the fitting wall 62, 63, 64 on which the cutout 60 is incorporated.

In the present embodiment, the cross-sectional openings of the plurality of incorporated bypass openings 65 are added. In other embodiments, bypass openings 65 of different sizes can also simply be provided. Different proportions of unfiltered water, to which filtered water is added, result from the different cross sections of individual bypass openings 65 or from the sum of a plurality of bypass openings 65 on one fitting wall, for example the fitting wall 64. This therefore results in a blending setting which is dependent on the angular position of the filter cartridge 53.

In addition to the described embodiments, further embodiments or combinations of these embodiments are feasible without any problems. For example, the coding structures described so far in the form of hexagonal polygons which are illustrated by way of example can have other coding structures added to them, once again for example in the form of quadrilateral polygons, and/or can be combined, as is additionally shown by way of example by one embodiment in FIG. 6.

Finally, in addition to a fitting/filter connection described in comparison to the embodiments in FIGS. 1 to 4, and in the form of an axial projection 23 on the tank-side filter connecting element 23, FIG. 6 shows a complementary form as an axial recess 23 which is formed in the tank bottom 29 in which, in the same sense, all of the coding options described with respect to the first embodiment can also be provided in this case, to be precise either in the same way and/or also in a complementary form, and/or in combined embodiments as well.

As a second major feature, FIG. 6 shows the possibility of using adapters 85, 86. The adapter 85 is illustrated, purely by way of example, for connection of a filter cartridge 73, which is likewise illustrated by way of example, to a tank-side filter connection 1, in which case the embodiment of the filter connection 1, in particular of its fitting 23, as already described above, may be not only in the form of an axially projecting fitting but also an axially recessed groove. The same applies in the same sense to the tank-side appliance connection on the underneath of the tank bottom 29. Because of the same functionalities in this sense, the individual elements are also provided with the same numbers, some of which have already been used above in the description.

The illustrated embodiment variants show the widely differing coding structures which can be provided according to the invention. In each case, this ensures that only appropriately matched filter cartridges with a key function fit into the corresponding tank-side filter connections.

Even more possible embodiments will be described in the following text with reference to FIGS. 1 to 26. In FIGS. 7 to 14, a tank/filter cartridge connection is described with coding structures, which are aligned axially with respect to a longitudinal axis of the connection, in conjunction with a further embodiment of an interlocking seal. For the sake of simplicity, features which correspond to the embodiments described above are annotated with the same basic number, but increased by the number 100.

FIG. 7 accordingly has a tank-side connecting stub in which a filter cartridge 131 is connected via a filter-side tank connecting stub or fitting 101. Corresponding to FIG. 8, the filter cartridge housing 136 of the filter cartridge 131 is inserted completely in the tank-side connecting stub or fitting 101. The end of the cartridge housing 136 is illustrated, in FIG. 8, behind an aperture slot 106 for the fresh water that is located in the tank to be supplied into the internal area of the connecting stub 101. A cutout 160 in the form of a hole is illustrated centrally in this visible section of the filter cartridge housing 136, which cutout 160 has the function of a blending element, and allows fresh water to flow through it and through a further opening, which is arranged behind this but cannot be seen here but can be seen in FIG. 13, into the filter outlet area 135 (FIG. 13), in which the water which has been filtered by the cartridge is passed into the tank outlet 168 (FIG. 14).

As one of a number of possible ways of fixing the filter cartridge 131 to the tank-side connecting stub 101, a holding guide web 115 for holding a radial projection 116, which is formed on the filter cartridge, is illustrated thereon. Both have a latching element 117 and 118, which are each complementary to one another and latch into one another in a snapping manner following an appropriate rotary movement during insertion of the filter-side tank connecting element 102, after overcoming corresponding clamping forces of the part which projects from the tank-side connecting stub somewhat like a vane. Since the latching element 117 has a thickened region in its front area, it is thus possible to ensure that the two connecting elements are latched to one another in a secure position, with respect to a rotary movement which is required for the insertion of the filter cartridge, with this thickened region being opposite an area of corresponding size cut out in the latching element 118.

Figure 9:
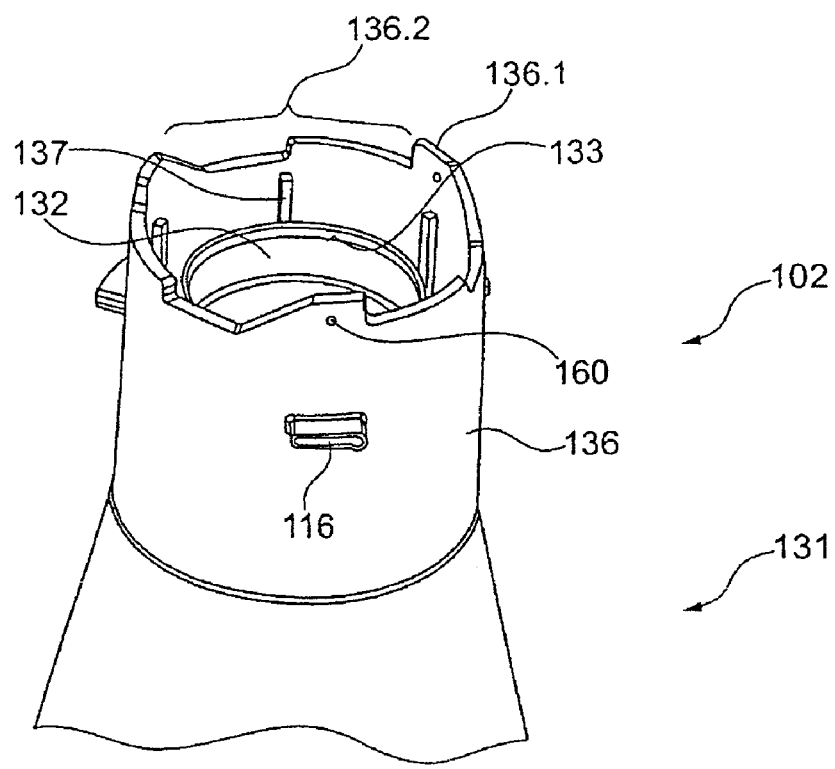

FIG. 9 illustrates the filter-side tank connecting area in the filter cartridge 131, with the housing 136 having a projection 136.1, which projects opposite cutouts 136.2, in the front, end area, in each case surrounding the aperture opening 160, which is already described above, as a blending element. For their part, the projections 136.1 of the filter cartridge housing 136 represent axially aligned coding structures which allow operational use of the filter cartridge in the relevant tank connecting element. As soon as one of these axial coding elements in the form of the housing projections 136.1 is missing, fresh water that is located in the tank flows directly through the aperture opening 106, which has an appropriately large cross section, and through the further bypass opening 165, which is located behind it and likewise has an appropriately large cross section, directly into the appliance inlet area 168.

Figure 10:
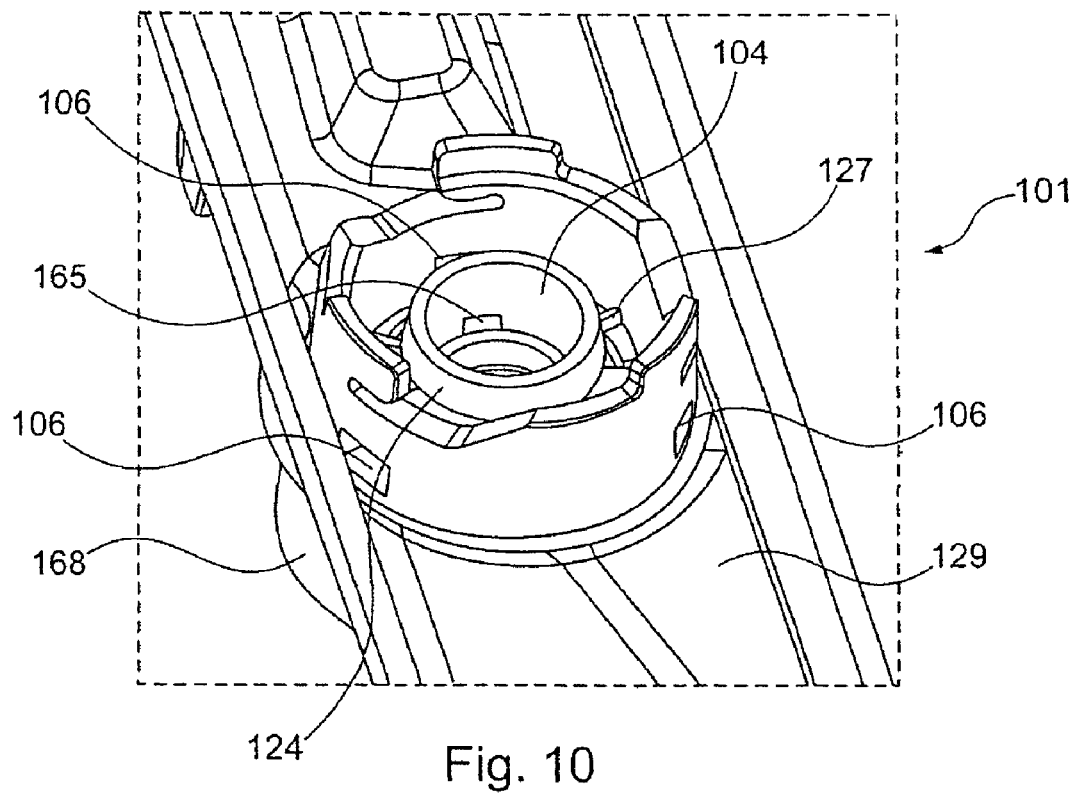

Any filter cartridge which might be inserted without corresponding actually projecting housing vanes 136.1 would have no filter effect because of the high flow rate of fresh water into the inlet area of the appliance connection, as can clearly be seen from FIG. 10.

The embodiment described here in each case has three axially aligned coding structures 136.1 on the filter housing 136 which, in particular, are preferably arranged offset through 1200 at the end on the circumference of the filter-side tank connecting element 102, as can be seen well in FIG. 9. The complementary connecting elements of the tank-side filter connection 101 are shown in FIG. 10.

Figure 11:
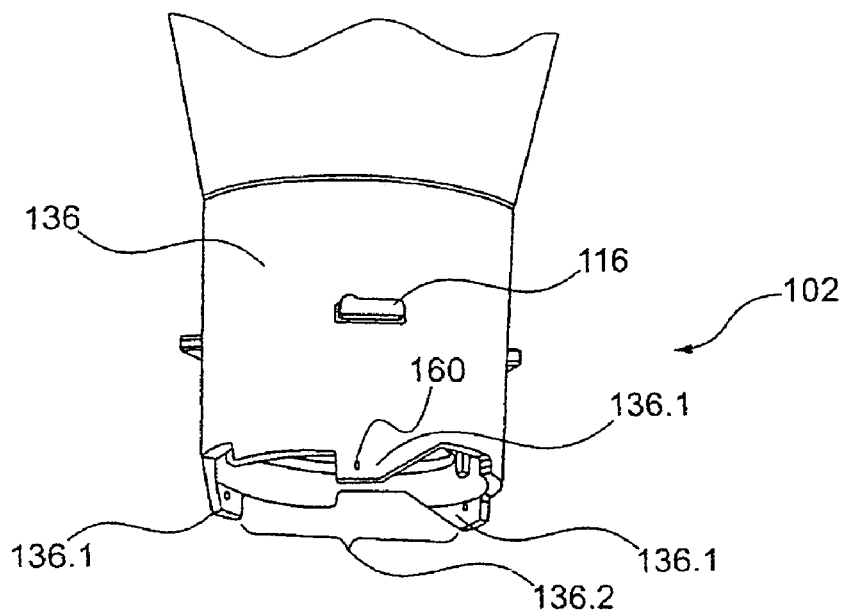
Figure 12:
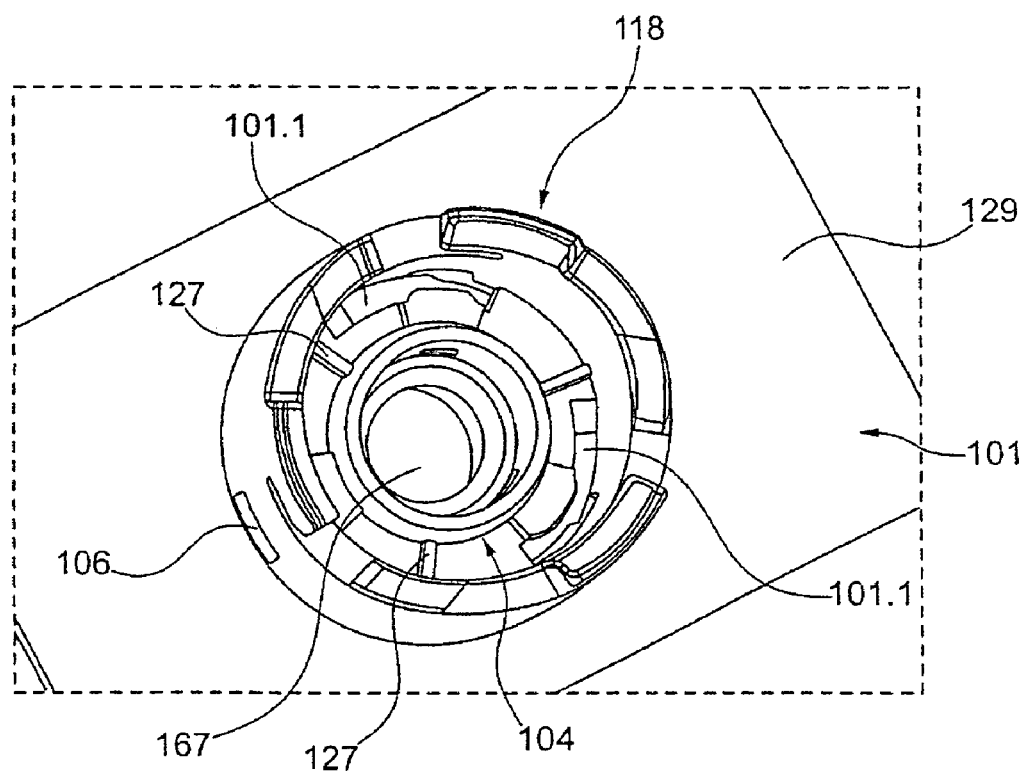

FIGS. 11 and 12 show two further views of this embodiment of a tank/filter connection 101, 102. In this case, three axial recesses 101.1 only two of which are illustrated on the tank-side filter connection 101, which can be incorporated in a recessed manner in the tank bottom 129 in order to make it possible for them to hold three complementary housing projections 136.1 on the filter cartridge. Once again, axial projections 136.1 and complementary axial depressions 101.1 are thus illustrated here as a coding structure in order to prevent the use of filter cartridges which are not intended for this purpose.

Figure 13:
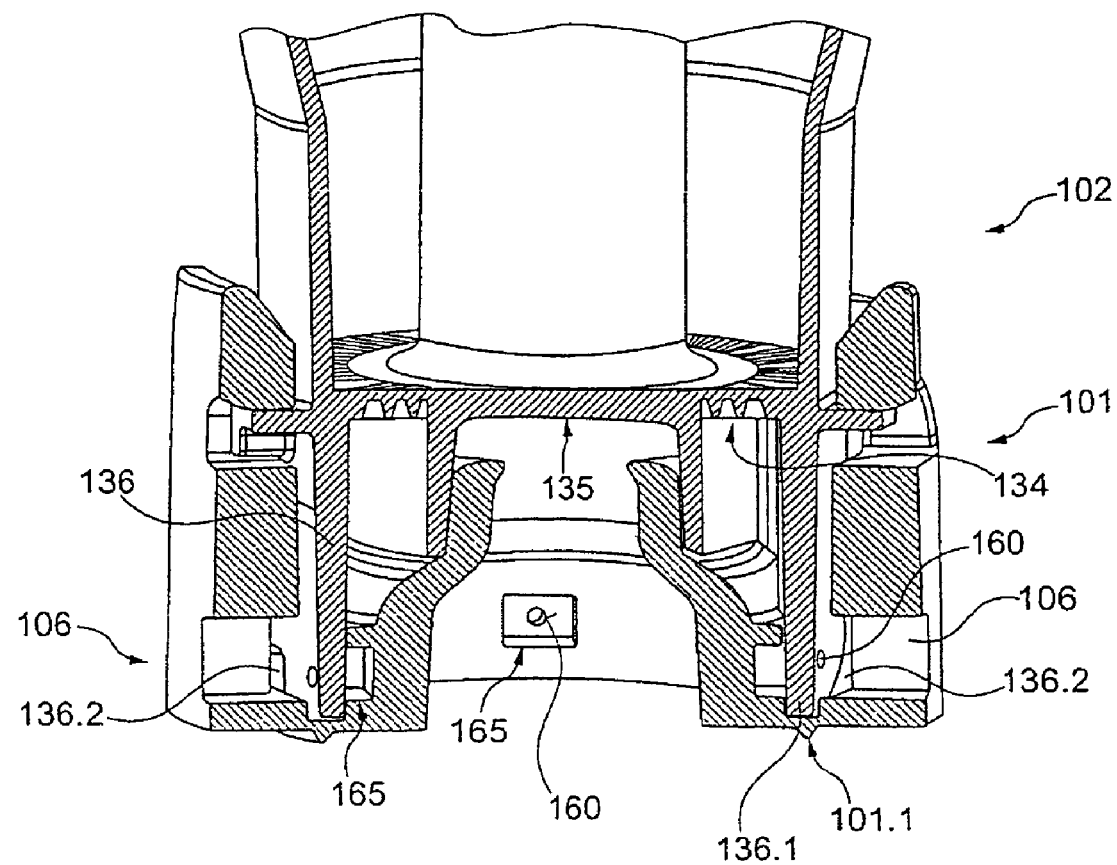
Figure 14:
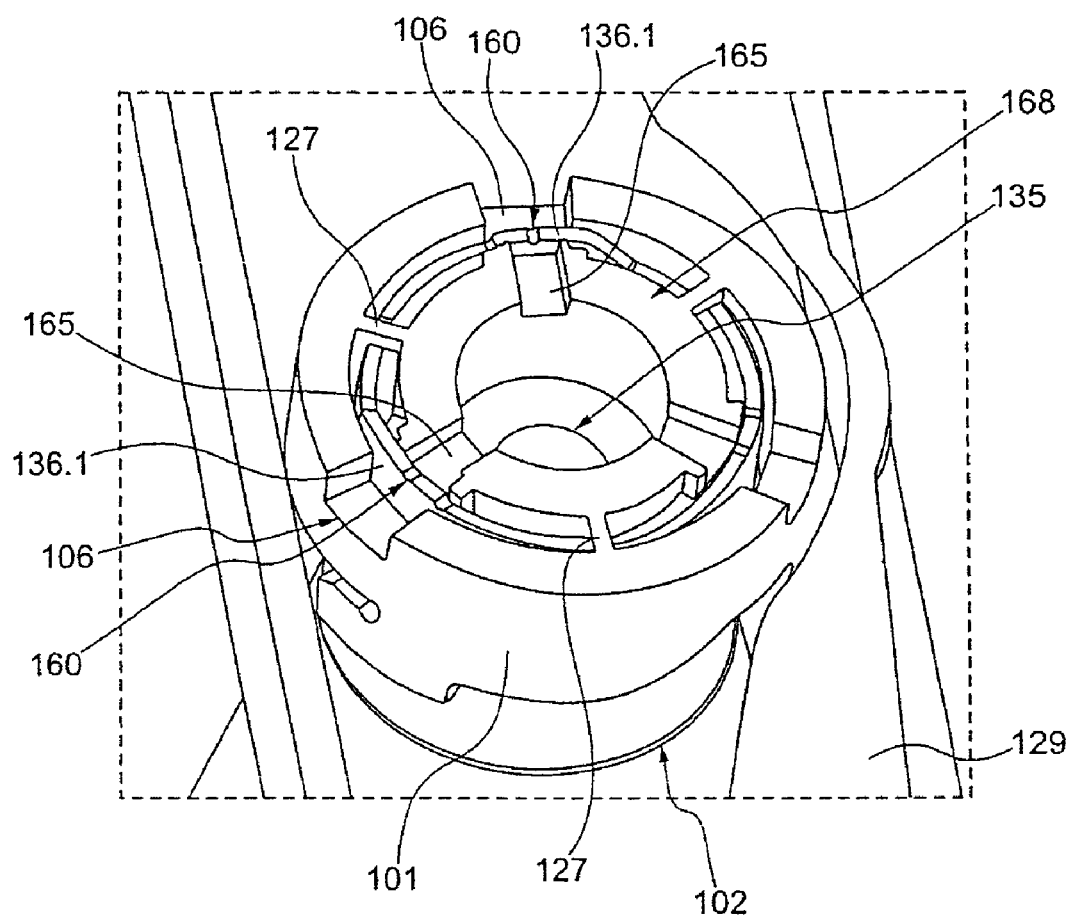
Figure 15:
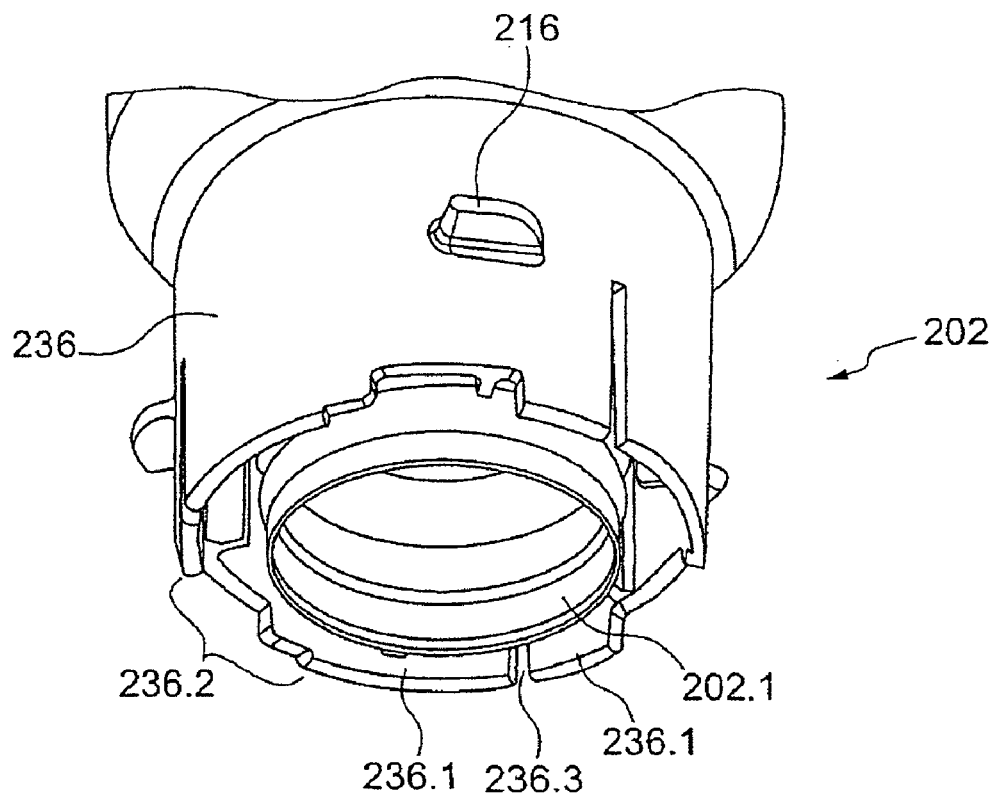

FIG. 13 shows a section through a tank-side filter connecting element 101 in which a filter-side tank connecting element 102 has been inserted. In this case, the bypass or short-circuiting openings 165, which are essentially closed by the three housing projections 136.1, can be seen in the lower, bottom area of the tank-side filter connecting element 101. When a filter cartridge has been inserted, the bypass function is implemented in such a way that a specific amount of fresh water is added to the filtered water which has been filtered by the filter cartridge and emerges through the outlet 135. If there is no cartridge, this axial coding structure is ineffective and this tank-side filter connection can be used only to pass on unfiltered fresh water that is located in the tank.

When a cartridge is inserted, fresh water which enters through the slot 106 can rise in the interior of the connecting stub 104 through the cutouts 136.2 and can enter the filter chamber of the filter cartridge through the inlet slots 134, can flow through the filter, and can be passed on from the filter outlet opening 135 into the inlet line of the tank or of the appliance.

FIG. 14 shows a further section view through the tank bottom 129, through a tank-side filter connection 101 connected thereto, and through a filter-side tank connection 102 inserted therein, as seen from the bottom of the tank. The bypass or short-circuiting lines 106 and 165 can be seen very well therein, indicating the unfiltered fresh water being passed through in a corresponding manner into the tank outlet area 168. When a cartridge with the correct axial coding has been inserted, as in the illustrated example, correspondingly intended blending of the fresh water to be filtered takes place through the bypass holes 160 which are formed in the housing sections 136.1, which project like vanes.

Instead of the three axial coding structures which are illustrated by way of example here and are offset through 120°, four, five or for example six such structures can be provided. The interval between the individual complementary axial coding structures can in this case be designed either to be symmetrical or else to be asymmetric.

FIGS. 15 to 20 show a further embodiment of an axially coded tank/filter connecting structure 201 and 202, in this case combined with an axial seal 202.1. This axial seal 201.1 is in the form of a circular, elastically deformable, sealing lip with a certain axial longitudinal extent in order, in particular, to make it possible to compensate in an advantageous manner for certain axial insertion tolerances, securely and in a reliably sealed manner, as well.

In this case as well, axially aligned coding structures are used as actual projections 236.1 of the filter housing 236 and axial recesses 236.2, corresponding to the already described embodiment with the number series 100. In addition, in this case, further axially aligned coding structures 236.3 are provided as slots in the end housing projection 236.1, and can be used not only for coding but also possibly for supplying fresh water into the internal area of the filter-side connecting fitting.

Figure 16:
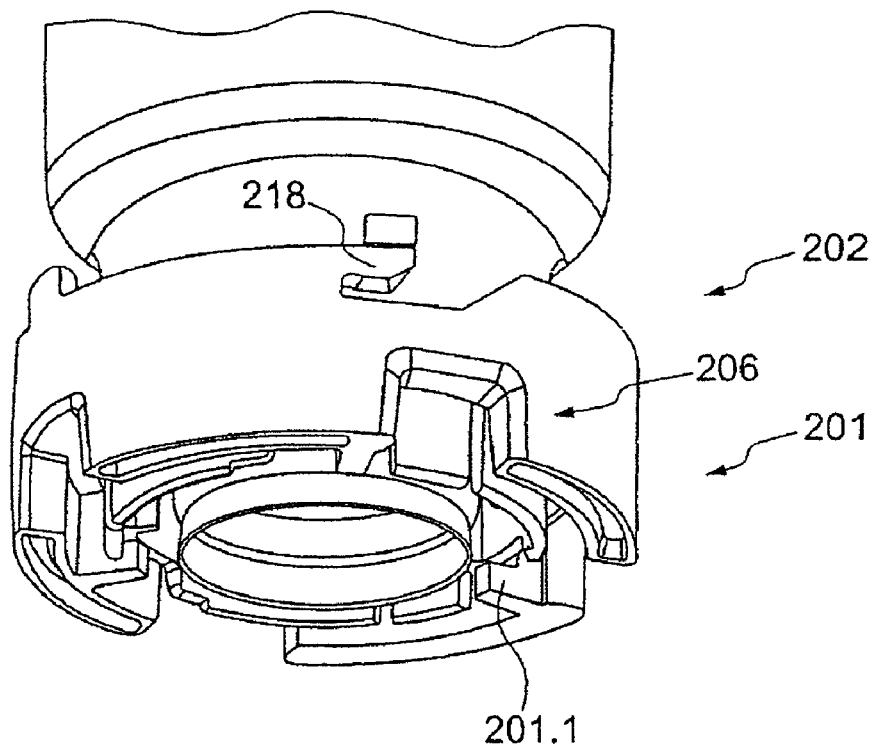

The axial coding structures 236.2 and 236.3 have associated axial connecting coding structures, which are shaped in a complementary manner in the tank-side filter connecting fitting 201 and are in the form of projections 201.1 which project axially from the tank bottom, as is illustrated in FIG. 16. In principle, this embodiment could represent the reverse of the coding structure in the embodiment described with respect to the number series 100. However, both embodiments represent only possible examples and can invariably be modified and/or be added to and/or replaced by further coding structures and sealing variants.

Figure 17:
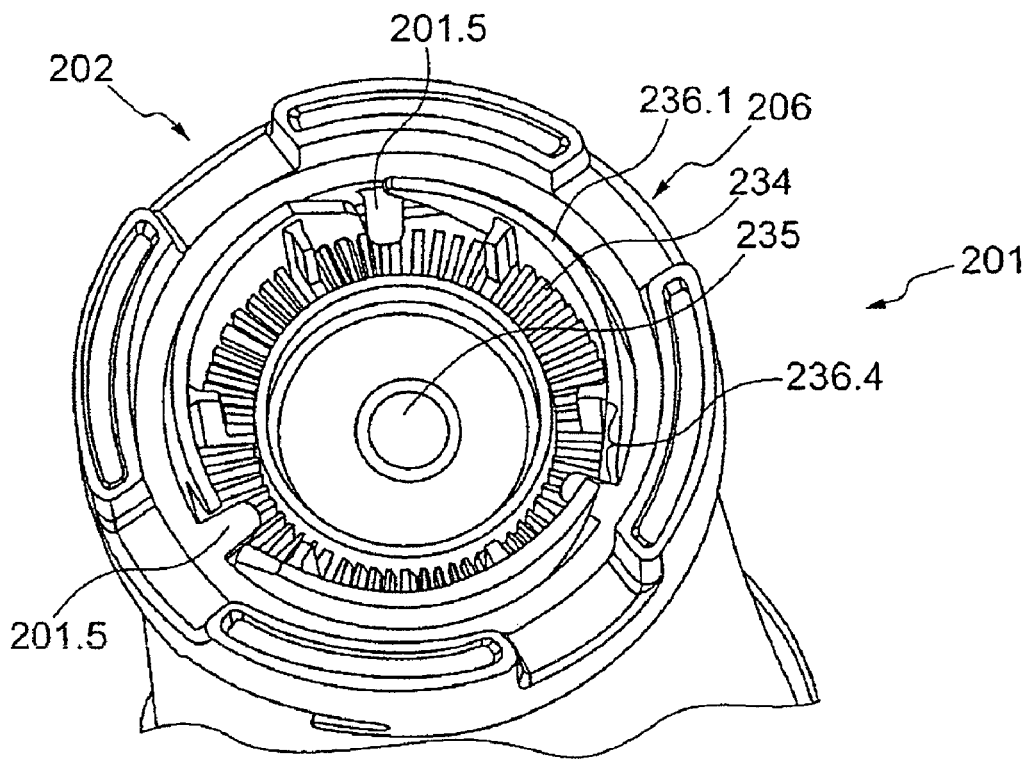
Figure 18:
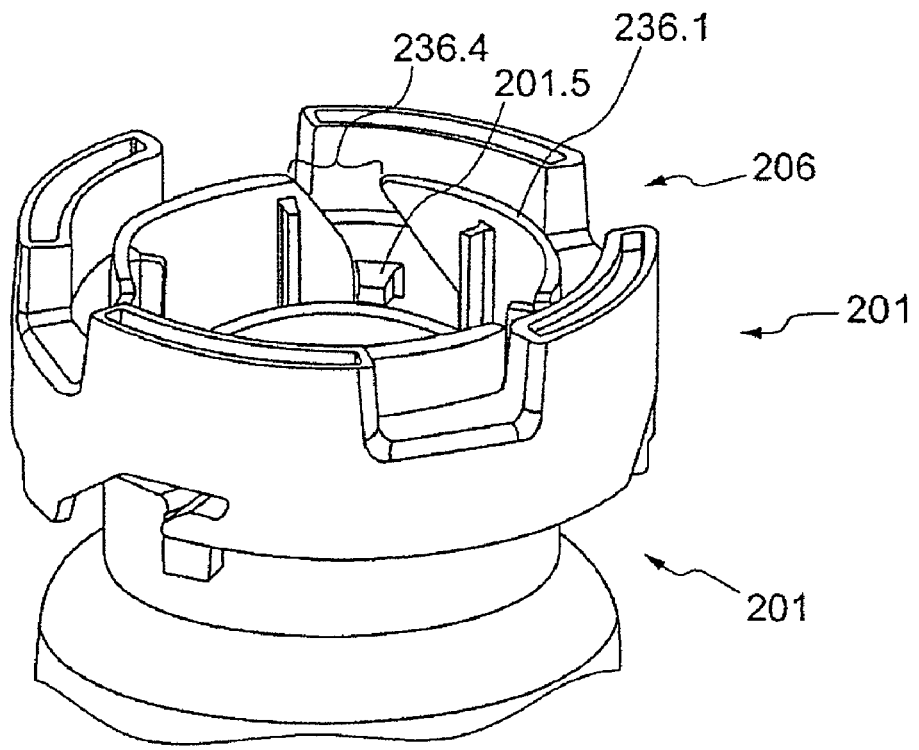

FIG. 17 shows a view from underneath of a tank-side filter connection 201 and of a filter-side tank connection 202 inserted therein and with an axially coded connection structure 236.4 and 201.5 which has been slightly modified in comparison to the axially coded connecting structure 236.1, 236.2, 236.3 and 201.1 as described above. The filter-side recess 236.4 is in this case in the form of an obliquely running slot which opens at the end on the filter housing 236 and is suitable for holding a coding element 201.5 which is in the form of a tab and points radially inwards from the tank-side filter connecting element 201. The oblique profile of the slot 236.4 in this case takes account of any axial insertion movement which may take place in order to fix the filter cartridge 231, with a final rotary movement. A filter cartridge without a recess 236.4 which is in the form of a slot and is aligned correspondingly axially cannot be inserted into a tank-side filter connecting fitting 201 which is coded in this way. In this embodiment as well, three-point coding, preferably positioned with a 120° offset, is provided just by way of example, although this is not essential and can invariably be added to and/or modified by different positions.

Figure 19:
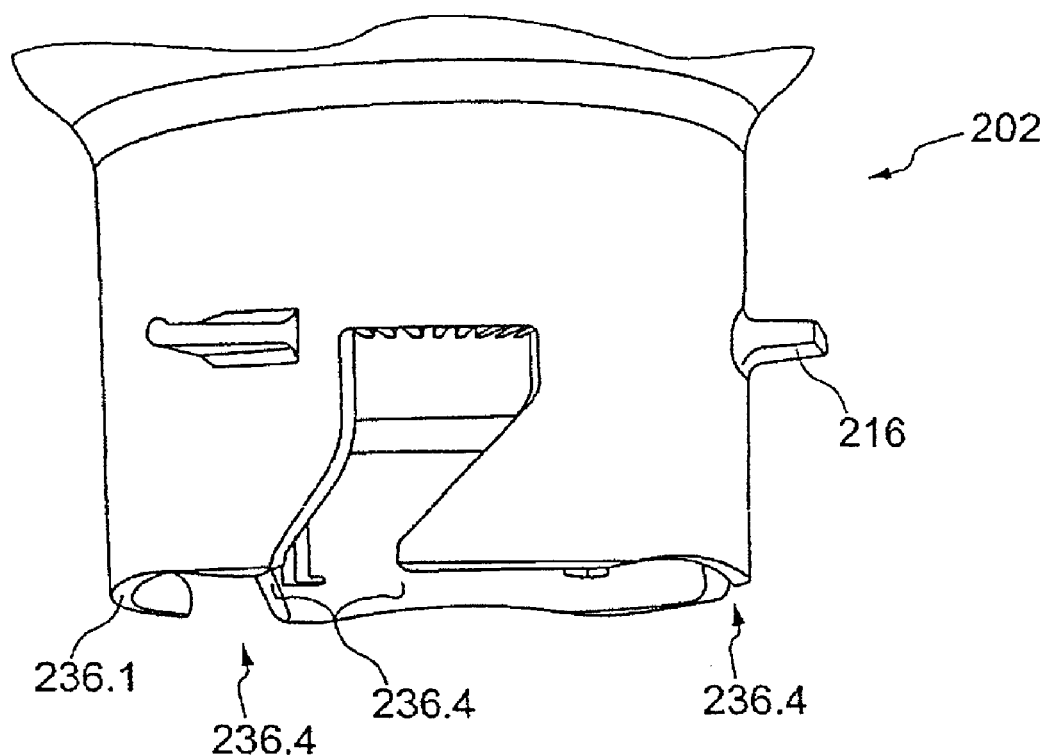
Figure 20:
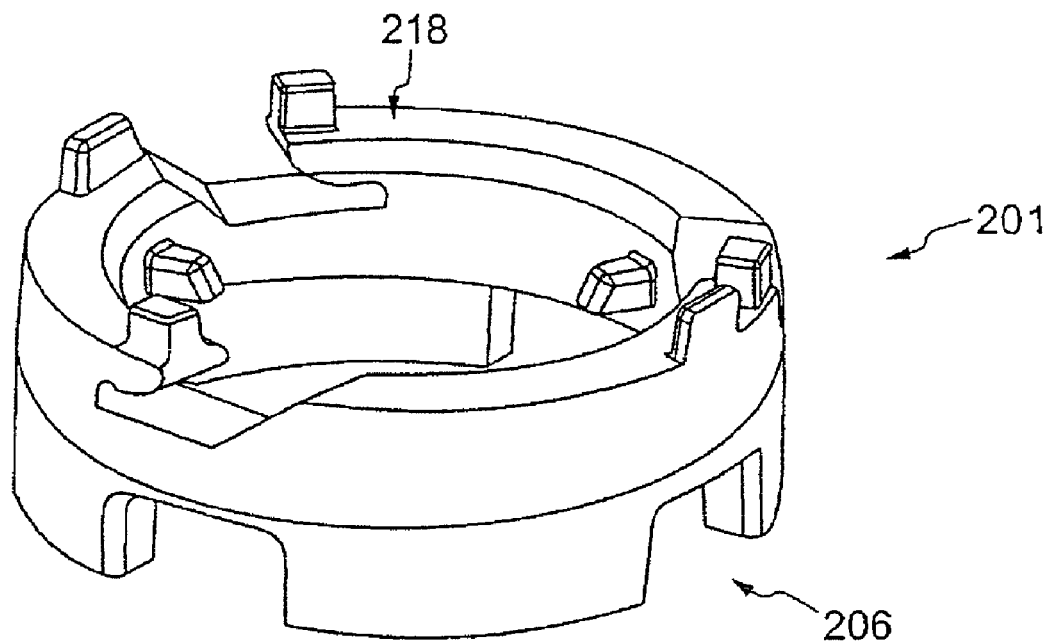
Figure 21:
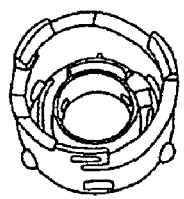
Figure 23:
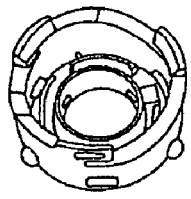
Figure 25:
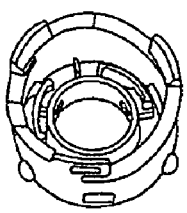

FIGS. 19 and 20 show the two elements described above and their major features, in each case illustrated separately.

Figure 22:
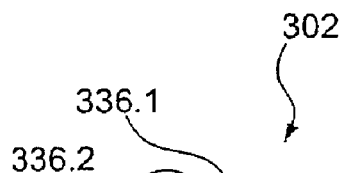
Figure 24:
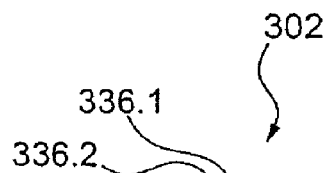
Figure 26:
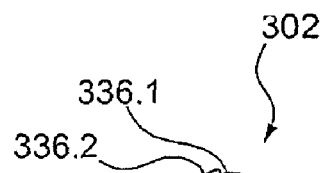

FIGS. 21 to 26 show further embodiments of similarly axially coded connecting structures in which, by way of example, axial coding structures 336.1, 336.2 and 337 are provided, viewed over the circumference, corresponding to FIGS. 22, 24 and 26 for the respectively illustrated, filter-side tank connections, and are each arranged in different angular positions with respect to one another, in order to distinguish between them. Tank-side filter connections 301 corresponding to FIGS. 21, 23 and 25 indicate the complementary axially coded connecting structures of the respectively associated tank-side filter connecting elements as further possible embodiments of different coding structures.

FIGS. 27 to 38 show further possible embodiments of coding and/or fixing structures for tank/filter connecting elements. In this case, FIGS. 27 to 30 show a first possible embodiment of bayonet connections, FIGS. 31 to 34 show a second, and FIGS. 35 to 38 show a third possible embodiment of bayonet connections, in particular double or multiple bayonet connections as a supplement to the embodiments already illustrated in FIGS. 7 to 26.

Figure 27:
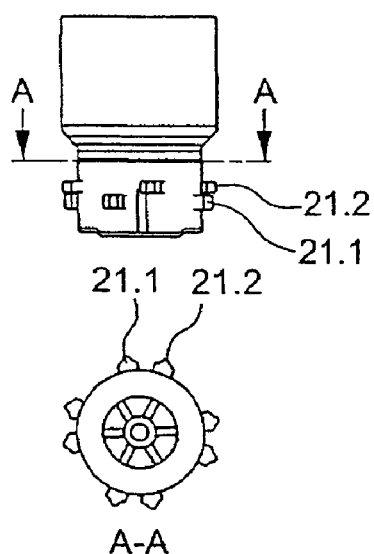
Figure 28:
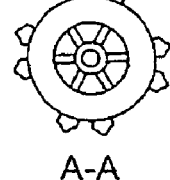
Figure 29:
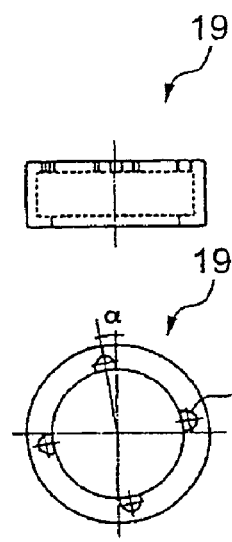

The major aspect in the case of the embodiments in FIGS. 27 to 38 is in this case to show different possible codings in the form of double and multiple bayonet connections and key codings in the form of key/lock functions. FIGS. 27 and 30 show the filter-side tank connecting coding and fixing structure with eight projections 21.1 and 21.2, in the plan view corresponding to FIG. 28, which, corresponding to FIG. 27, are provided along the longitudinal extent of the filter-side tank connecting element, both axially and in mutually offset radial angular positions, as two pairs of four.

Figure 31:
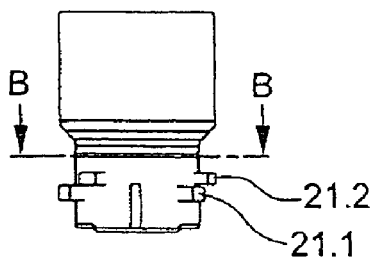
Figure 32:
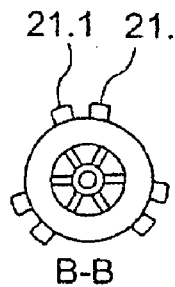
Figure 33:
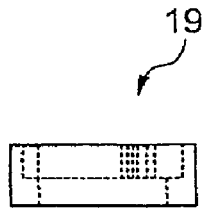
Figure 35:
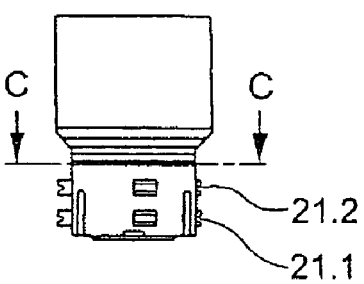
Figure 36:
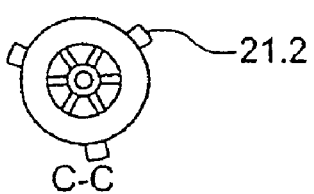
Figure 37:
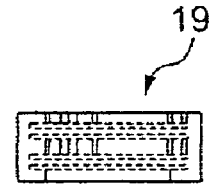
Figure 43:
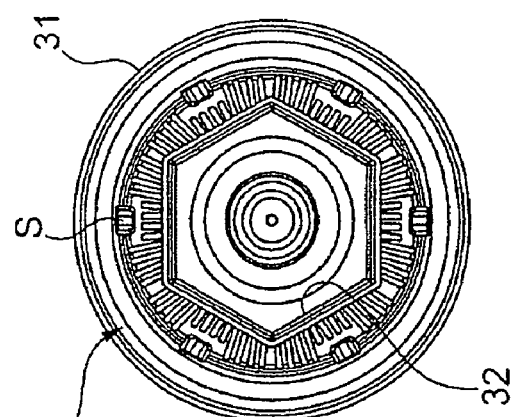
Figure 42:
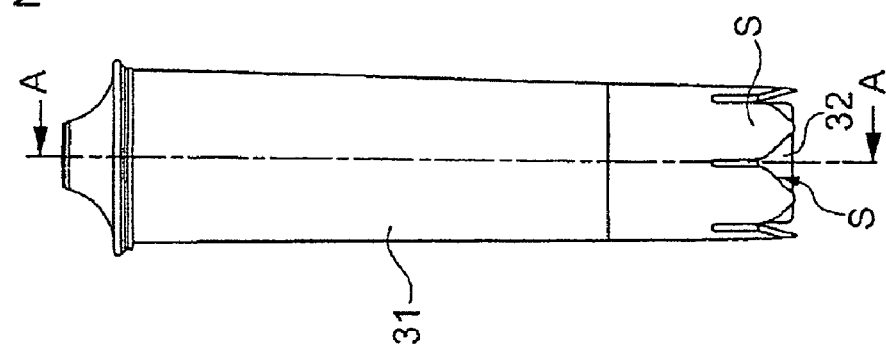
Figure 41:
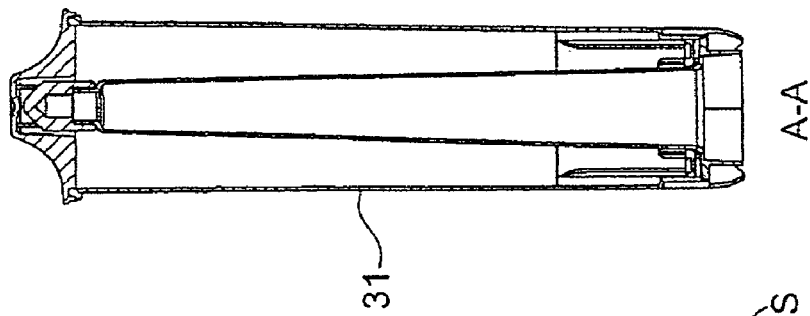
Figure 40:
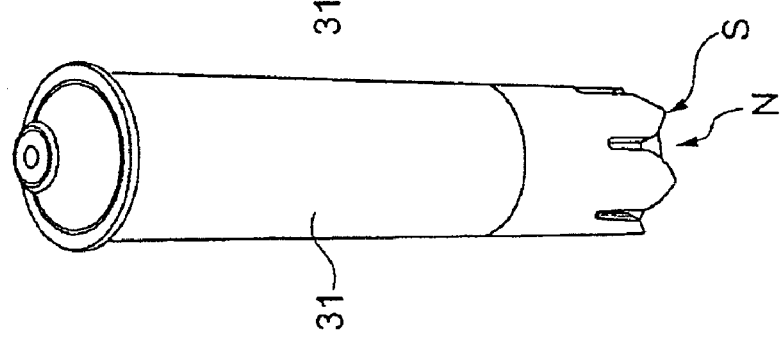
Figure 39:
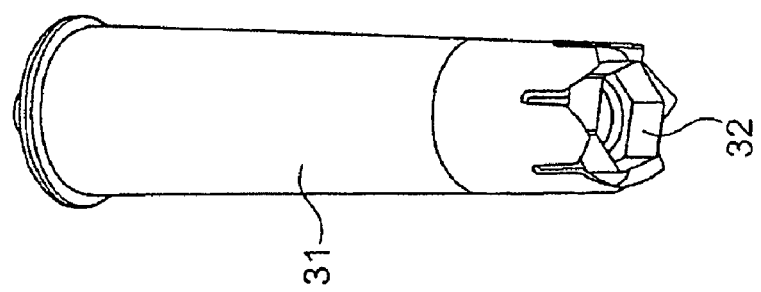
Figure 44:
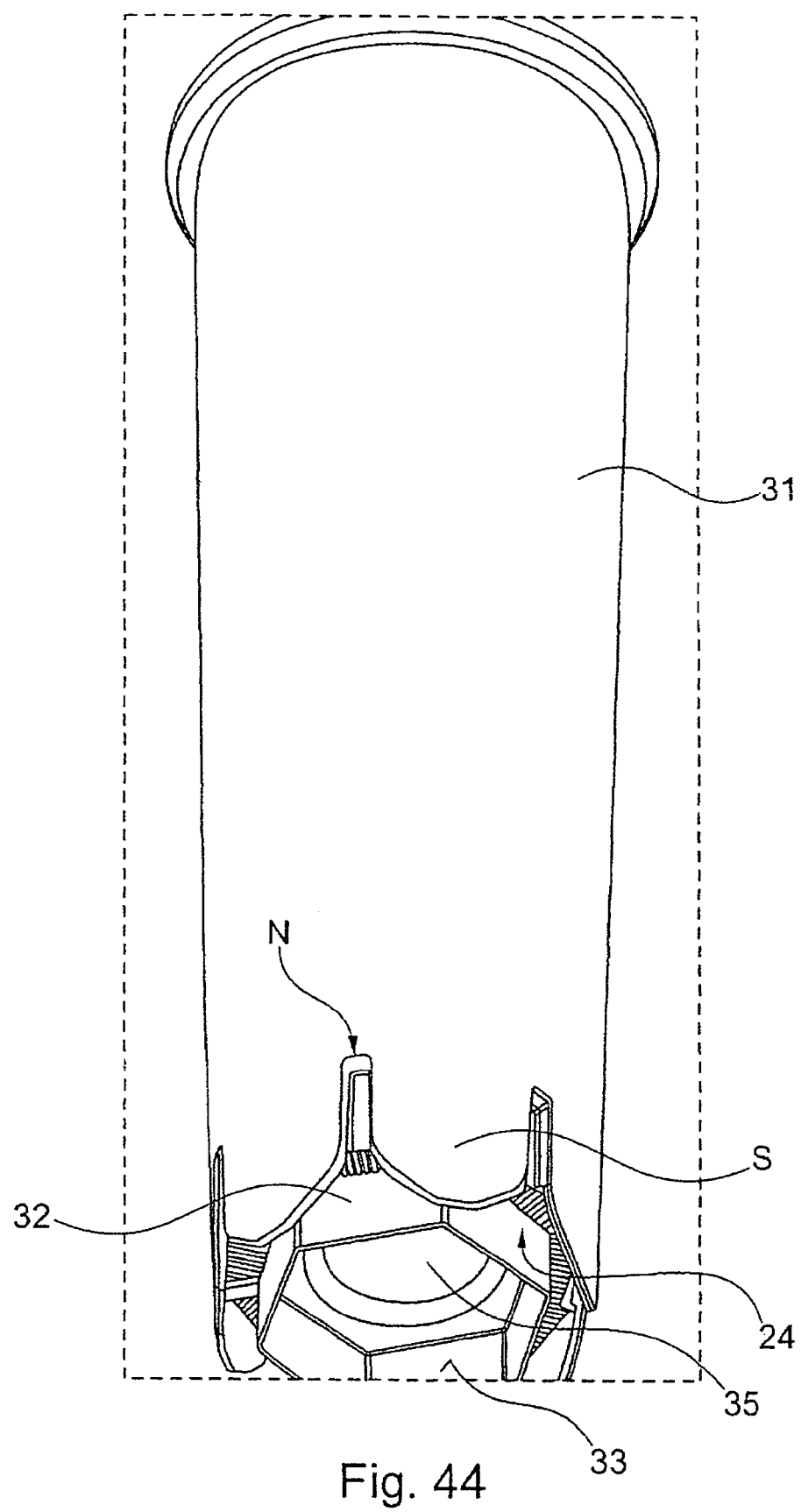

The complementary connecting and coding structures 20 are shown in the tank-side filter connecting element 19 in FIGS. 31 and 32. In this embodiment, corresponding to FIG. 32, an angle α is illustrated between one axis of an x-y coordinate system that is shown and an axis which runs through the opening 20, as a comparatively acute angle α. In order to allow the filter-side tank connecting element 8 to be fixed to the tank-side filter connecting element 19, those coding projections 21.1 which are arranged furthest forward at the end must be arranged distributed in a manner corresponding to the circumferential distribution of the openings 20 on the tank-side filter connecting element 19 in such a manner as to allow any axial insertion of the filter-side tank connecting element at all. After overcoming the first insertion depth relating to the coding projections 21.1, a rotary movement must be carried out about a longitudinal axis which runs through the filter-side tank connecting element until the second set of coding projections 21.2 matches the openings 20, thus allowing further axial insertion of the filter-side tank element into the tank-side filter element, until it is fixed, following a further rotary movement about the longitudinal axis, by means of the filter-side tank connecting element.

FIGS. 31 to 34 illustrate similar embodiments, but with contours, which have been modified in comparison to the embodiments 27 to 30, of the openings 20 and of the coding projections 21 that are complementary thereto and with respect to alignments with modified angles, when viewed axially and in a plan view.

A further difference is also the number of coding structures in each case. In the embodiments 27 to 30, there are a total of eight on two levels, and in the embodiments 31 to 34 there are in each case only six, as two triple-coded projection levels. These coding structures described here can also be combined without any problems with other, for example axially aligned, coding structures in order to allow even further distinguishing options for individual tank/filter connections.

Figure 45:
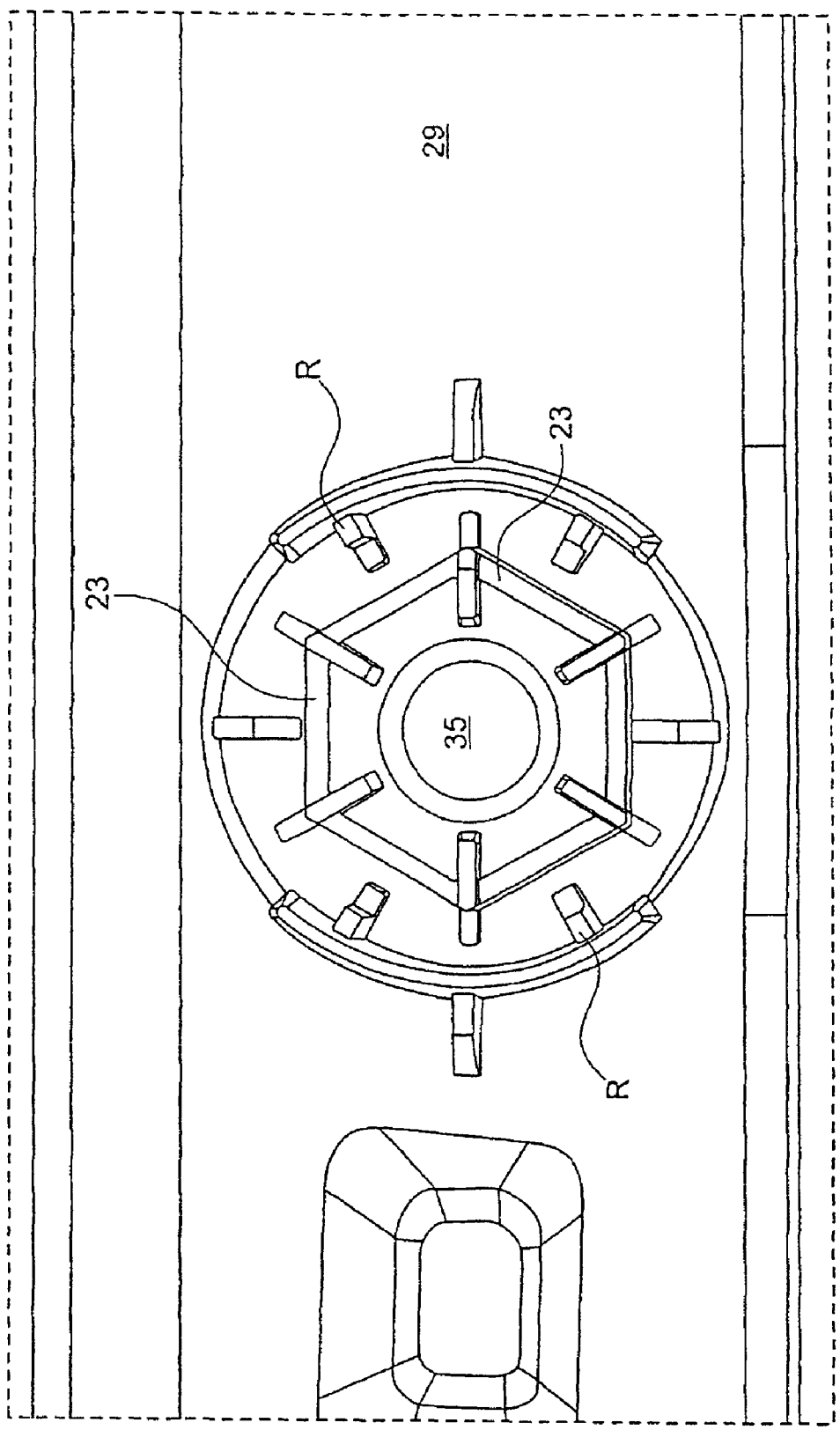
Figure 46:
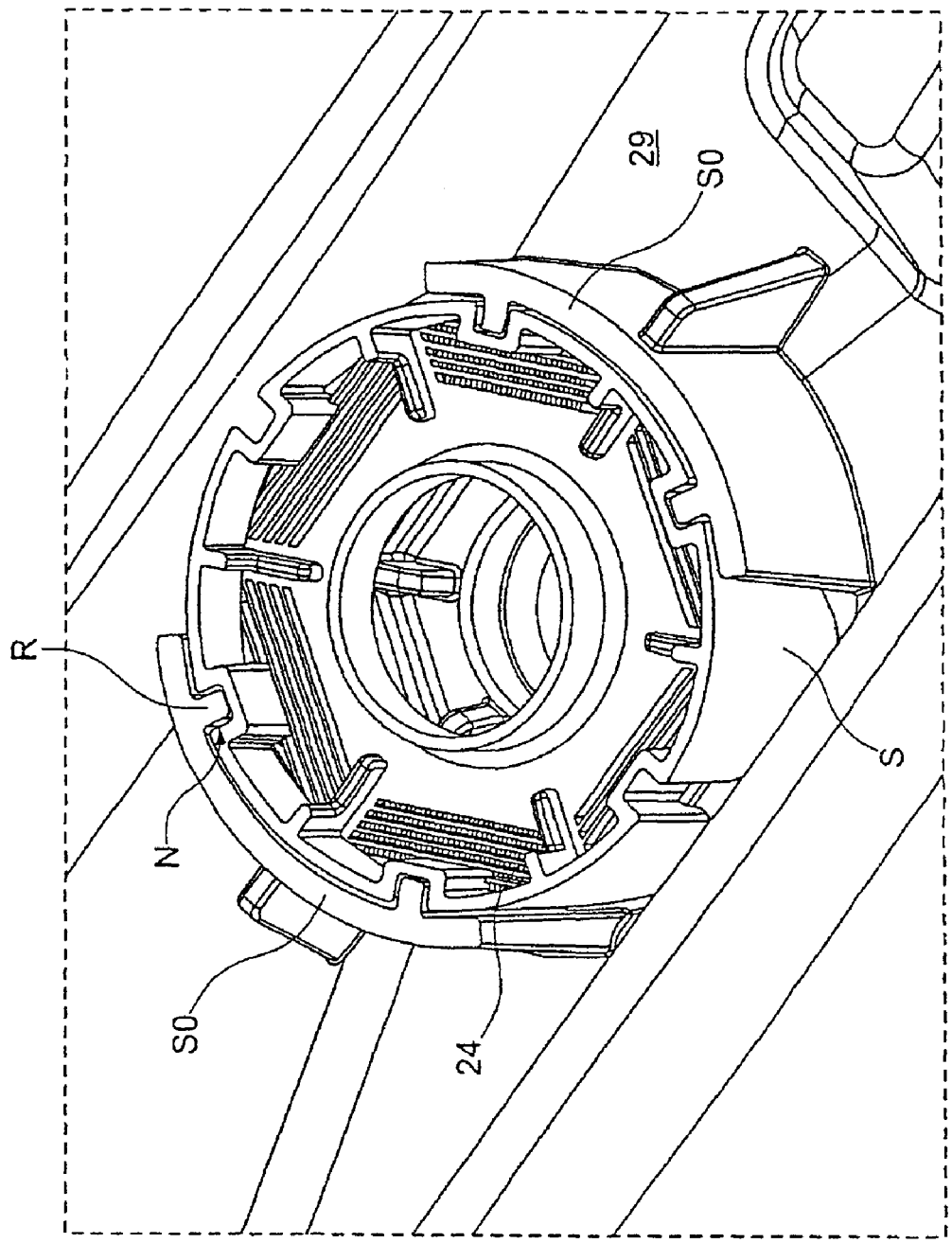

FIGS. 39 to 46 show a further embodiment of a tank/filter connection, in various views and illustrations such as oblique plan views, section illustrations, a front view and a view from underneath of the filter cartridge 31, as well as a plan view of the tank-side filter connecting element with and without a filter-side tank connecting element inserted (FIGS. 45 and 46).

The major features of the embodiment of a tank/filter connection are the approximately wedge-shaped points S which project at the end from the filter cartridge 31, and the grooves N arranged between them. The geometric dimensions and angular positions of these points S and grooves N with respect to one another once again allow different codings and fixing points for the filter-side connecting element on the tank-side filter connecting element.

The points can also be used for positioning during insertion of the filter cartridge into the tank connecting stub, in particular for connections which cannot be seen visually, for example in order to avoid damage to the sealing structures and/or other structures.

In this case, the slot separations and/or the slot widths and/or widths of the points or projecting vanes, likewise as well as their lengths and/or separations, which must correspond to corresponding structures on the tank-side filter connecting element, are particularly suitable for coding in order to allow the insertion of a filter cartridge whose use is permitted.

These corresponding coding and/or fixing structures comprise ribs R (FIG. 45), which are formed on the tank-side filter connecting element and whose interaction with the coding and/or fixing structures N and S that are formed on the filter-side tank connecting element can best be seen in FIG. 46. In this case, the ribs R are formed on a fitting SO which partially surrounds the filter-side tank connecting element and is in the form of a wall.

The coding and/or fixing structure described above may also be in a complementary form, in an embodiment which is modified from this, that is to say with grooves instead of ribs, and ribs instead of grooves. In a further modified embodiment, however, a mixed or combined coding and/or filter structure is also invariably possible, by forming grooves and ribs on one tank-side or filter-side connecting element, and/or on the other.

Figure 47:
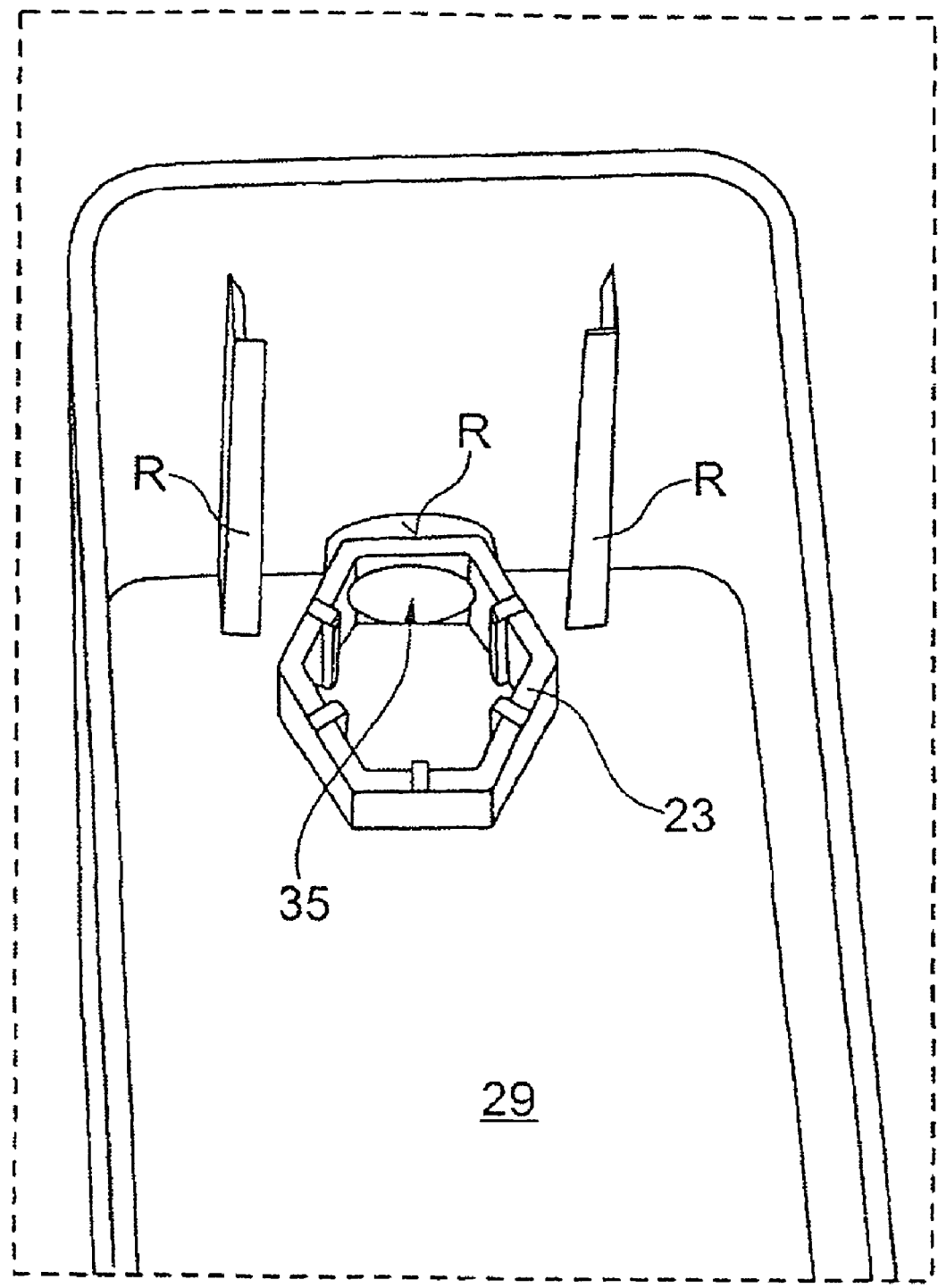
Figure 48:
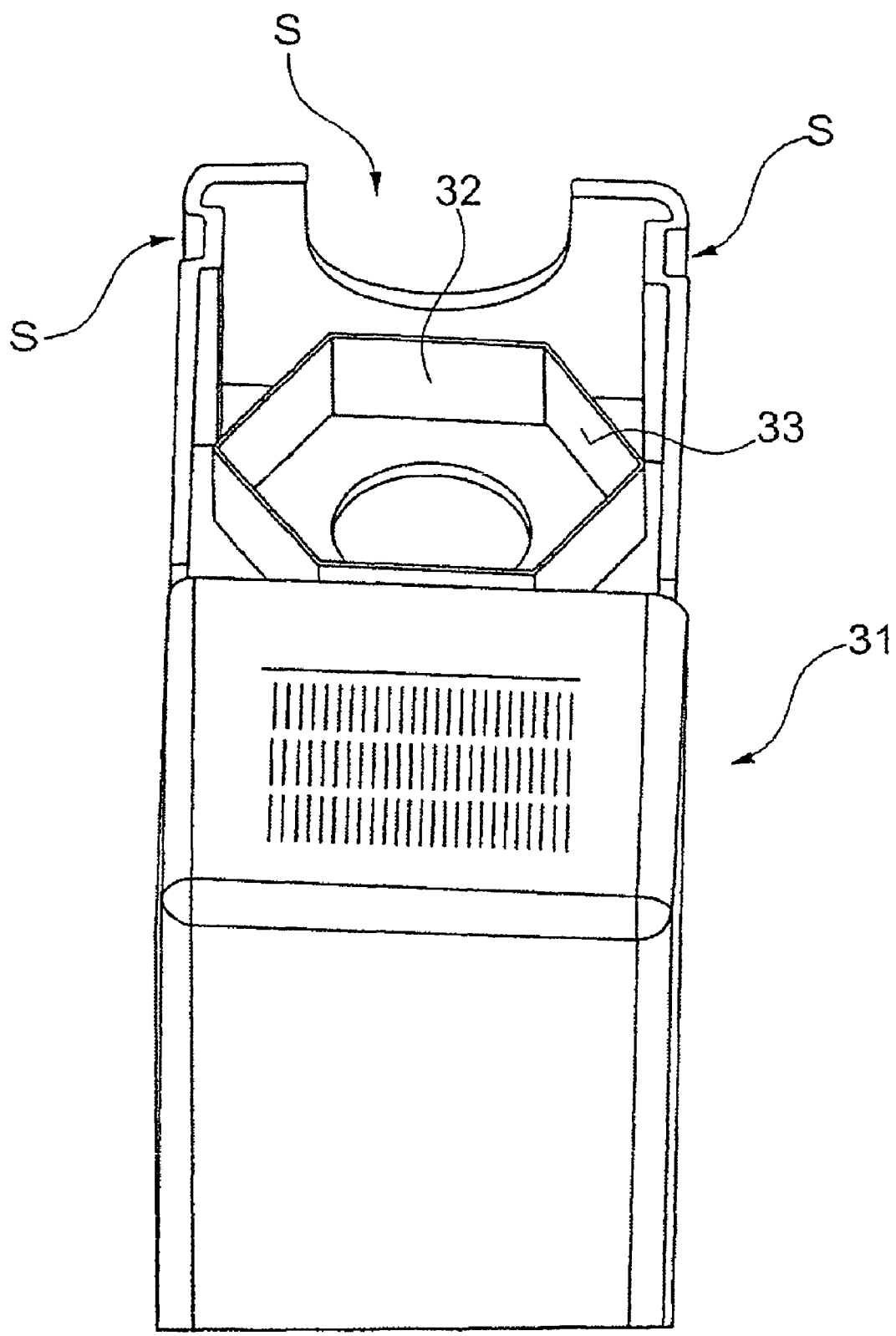
Figure 49:
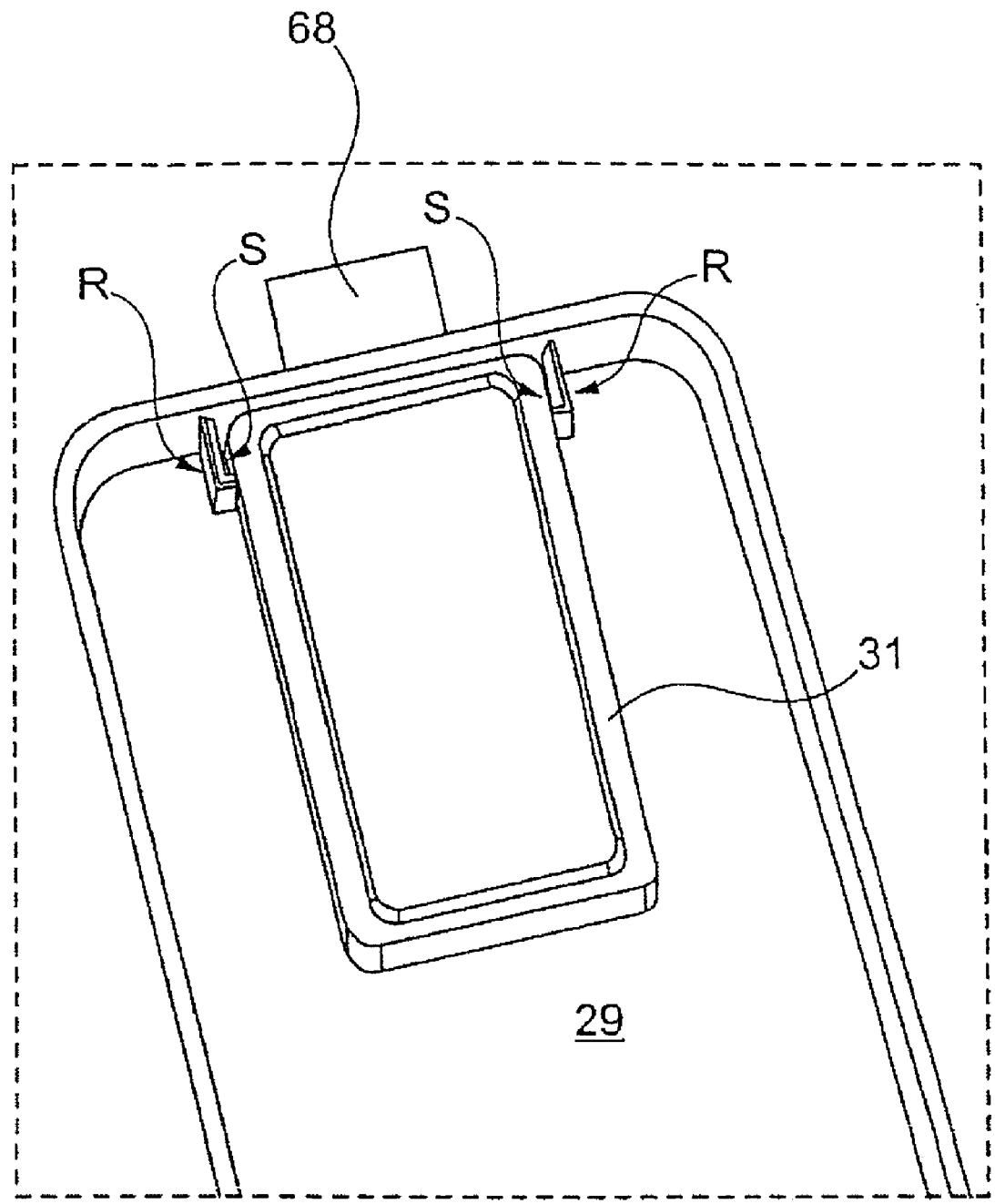
Figure 50:
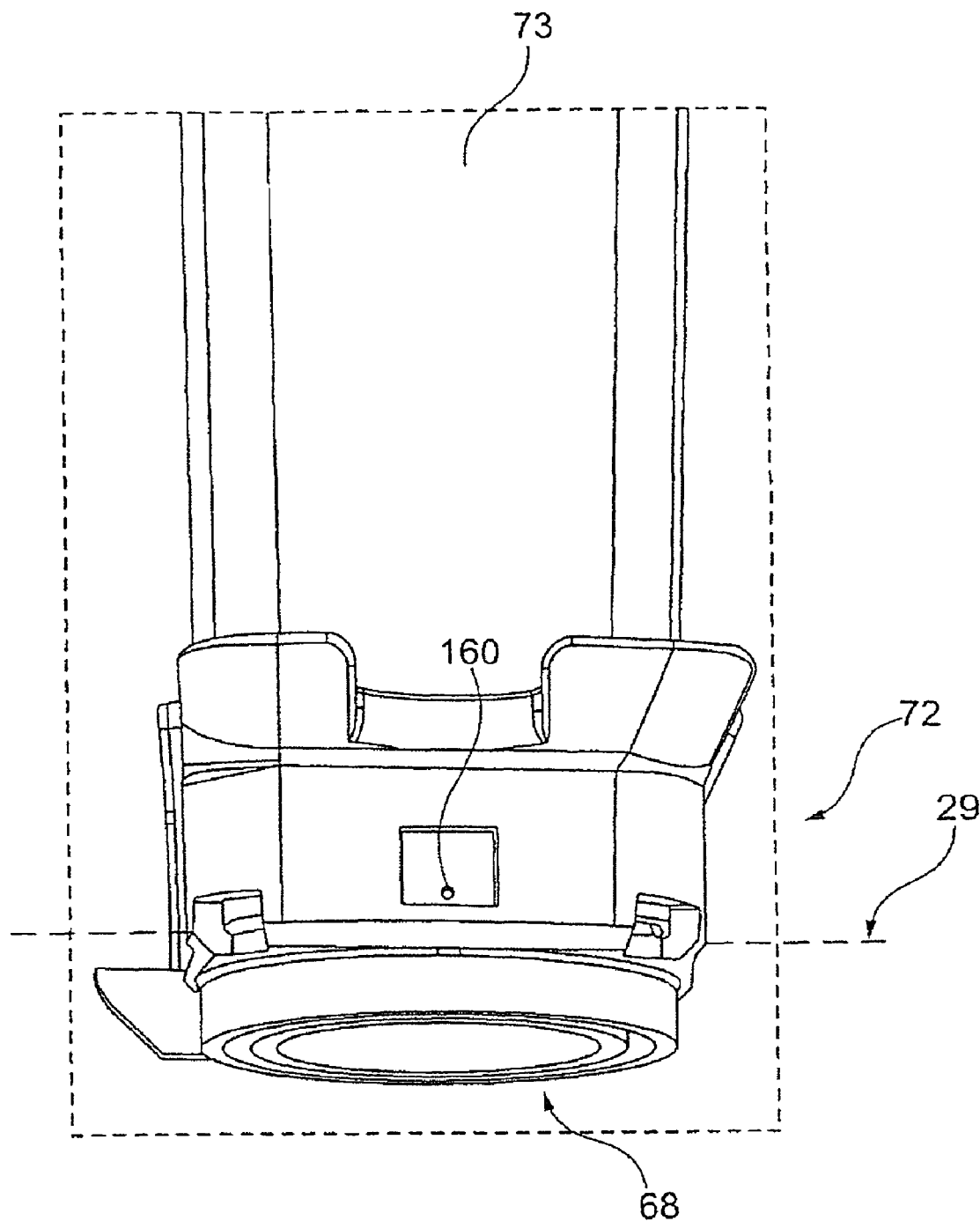
Figure 51:
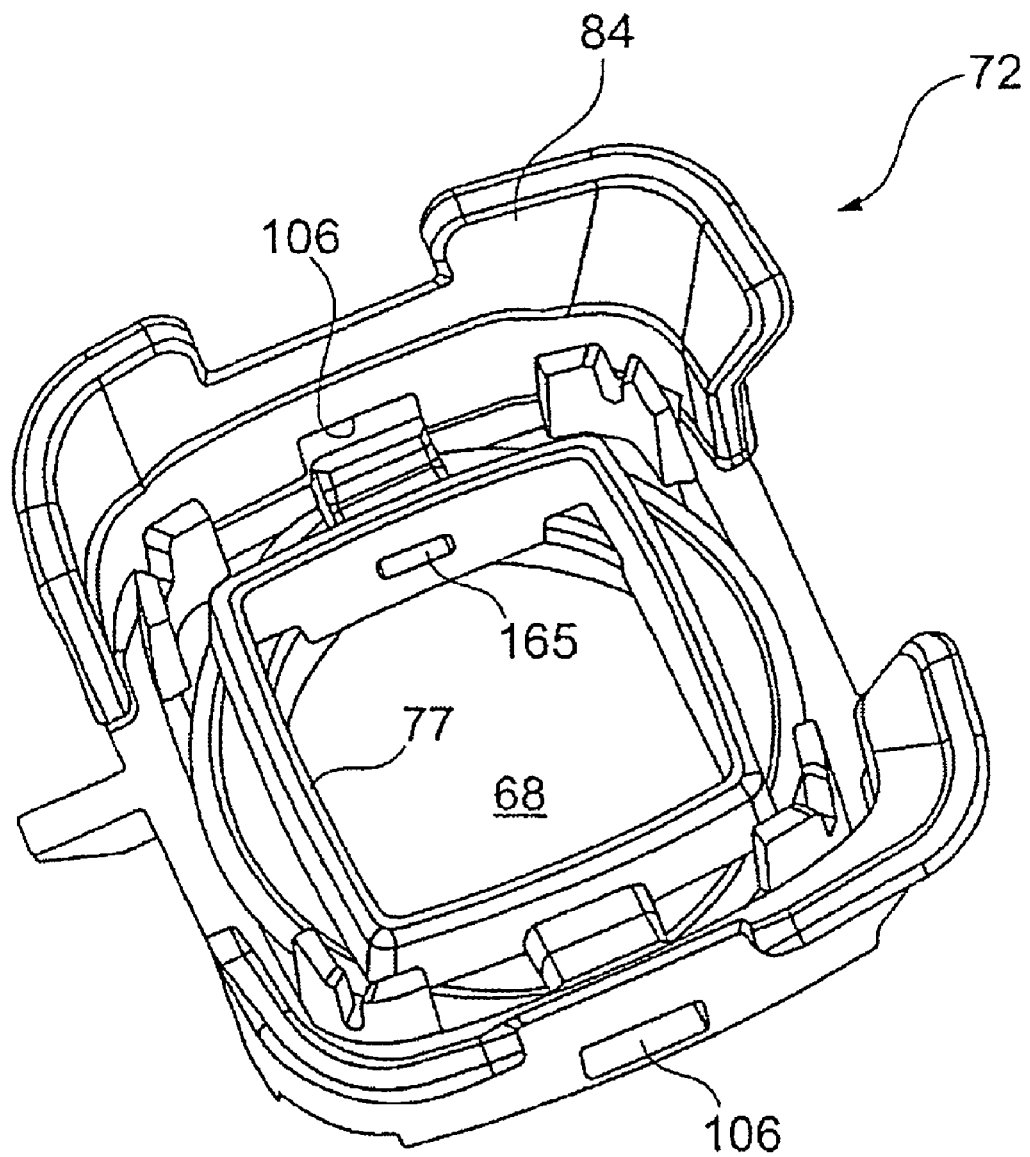
Figure 52:
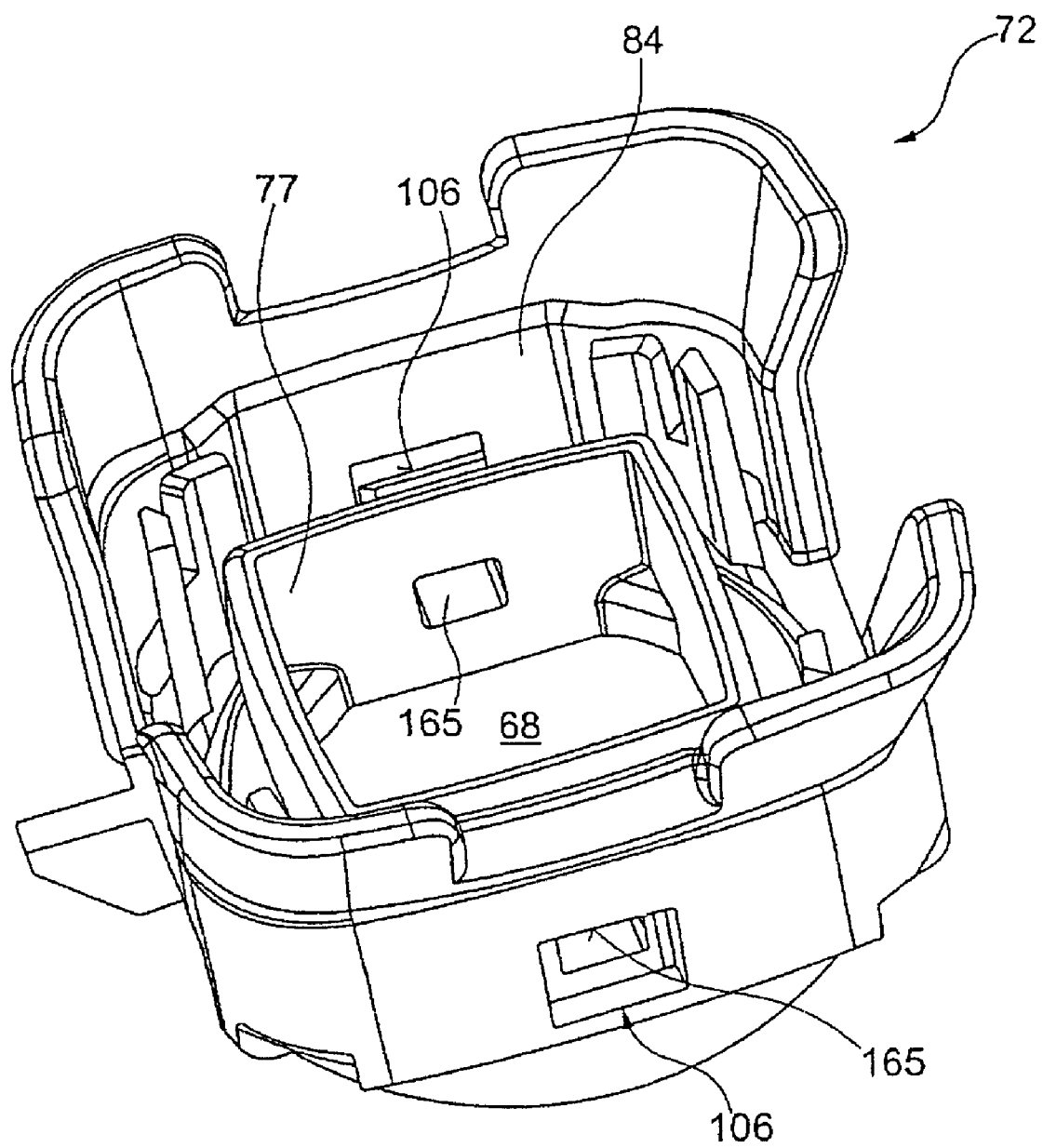

FIGS. 47 to 49 illustrate a further embodiment in which the filter 31 is inserted into the interior of the tank along a guide which is arranged on a tank wall, has two ribs R formed at an angle, and engages in two complementary slots R. In its bottom 29, the tank has a polygonal, in this case hexagonal, filter connecting element 23 and a tank outlet opening 35, which is passed to the exterior through the tank wall from within this connecting element.

In order on the one hand to allow sufficient water to be passed out through this tank outlet opening 35, which is formed on the wall side, and on the other hand to allow the tank to be emptied as completely as possible, the polygonal connecting element 23 is formed on the tank bottom with a polygon inclined on its upper face. The filter-side tank connecting element 32 in the form of a conical, likewise polygonal, molded seal 32 has a correspondingly complementarily inclined connecting surface. The filter cartridge 31 can be passed through this and, fixed by the ribs R and complementary slots S, can be inserted vertically on the tank wall downwards into the interior of the tank and can be inserted in an interlocking and sealed manner through the coding structure formed in this way with the tank bottom for filtering of the water that is located in the tank.

In this embodiment as well, as in the case of all the other embodiments apart from this as well, a bypass structure, which is not illustrated here but as has been previously described, can preferably be provided in order to allow blending of the filtered water. A supplementary structure R, which is in the form of ribs, and a complementary coding structure S, which is in the form of slots, are provided here by the end recess S in the filter wall and the complementary shape R of the outlet opening 35 in the bottom area of the tank wall. These can also be modified appropriately, for example with a structure which has a quadrilateral shape, a triangular shape or other structure having further recesses and/or projections, in order to distinguish between different permissible filter types.

A further embodiment of quadrilateral coding for a tank/filter connection is illustrated in FIGS. 50 to 53. In addition to the embodiment illustrated in FIG. 6, this embodiment has a bypass structure. This bypass structure comprises an opening in the form of a hole 160 in the end housing extension of the filter cartridge 73, which opening is coincident with an opening 165 that is formed in a tank-side filter fitting connecting element 77, allowing raw water that is located in the tank to flow through to the tank-side appliance connection in the outlet area of the tank, for mixing with the water that has been filtered by the filter cartridge. In this case, on the filter side, the bypass opening 160 is formed in the end extension of the filter and provides a blending apparatus in conjunction with the tank-side filter connecting element 77.

A further possible way to provide a blending apparatus could be achieved by the arrangement of this bypass opening 160 opposite an opening 106 formed in the outer shell 84, in which case it may then be necessary to provide a corresponding channel guide in the interior of the filter cartridge and/or in the interior of the tank-side connecting element, in order to mix the blending water released in this way with the filtered water which flows through the filter cartridge and out of its outlet-flow opening 35.

Figure 53:
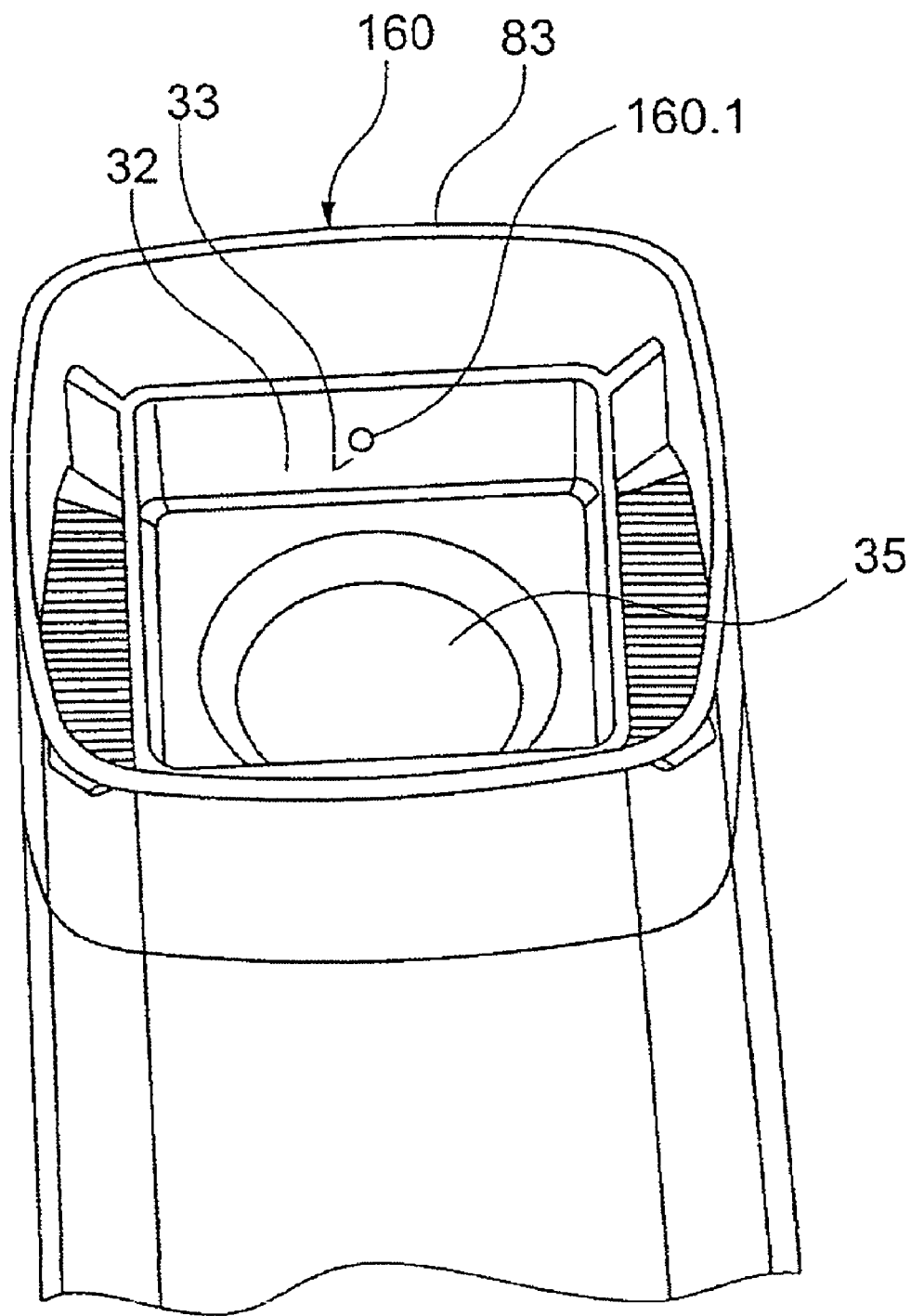

As illustrated in the embodiment in FIG. 53 a further blending structure can be provided by forming a bypass opening 160.1 in the polygonal filter-side tank connecting element 32, in this case in the form of a quadrilateral molded seal 32, which in turn corresponds to the opening 165 that is formed in the tank-side filter connection 77. The size of the opening 161.1 in this case once again governs the blending amount. In this embodiment, the blending apparatus is provided directly in the sealing area of the polygonal tank/filter connection.

Figure 54:
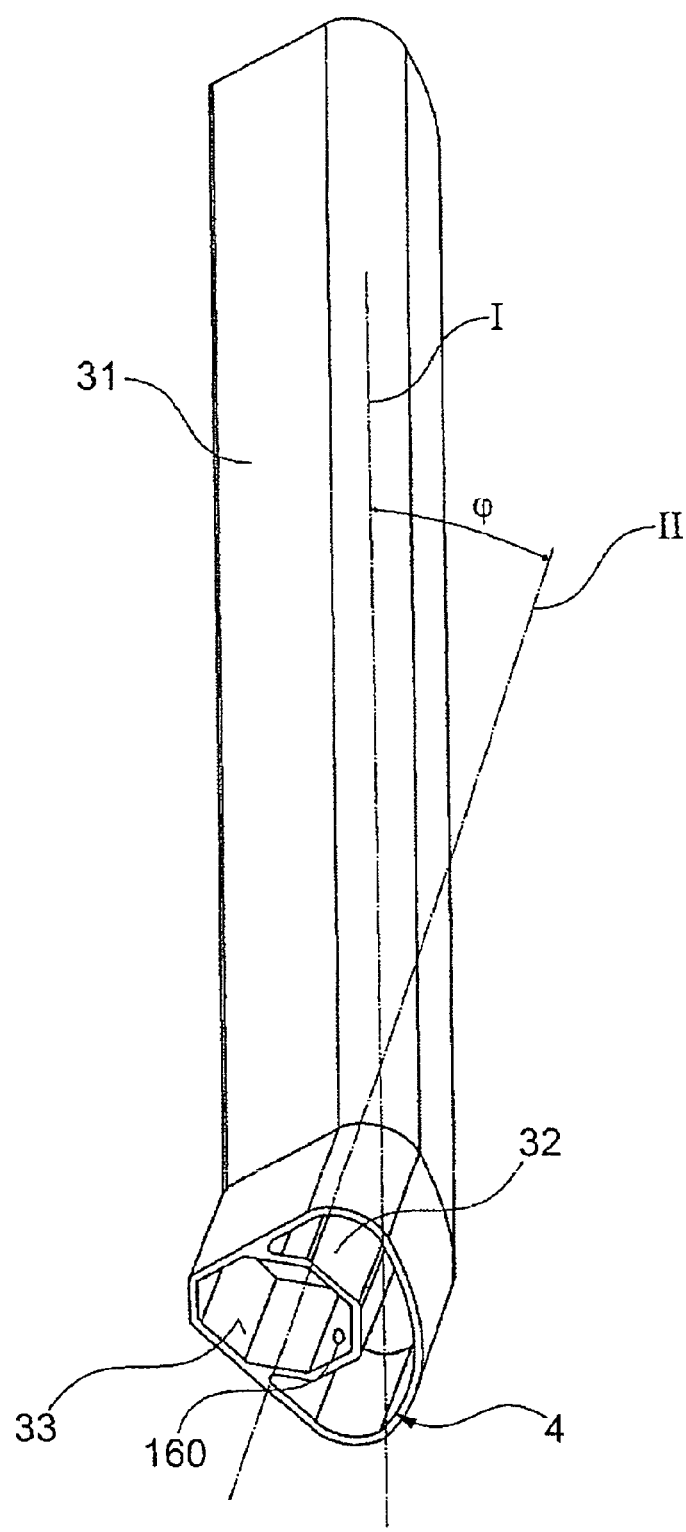
Figure 55:
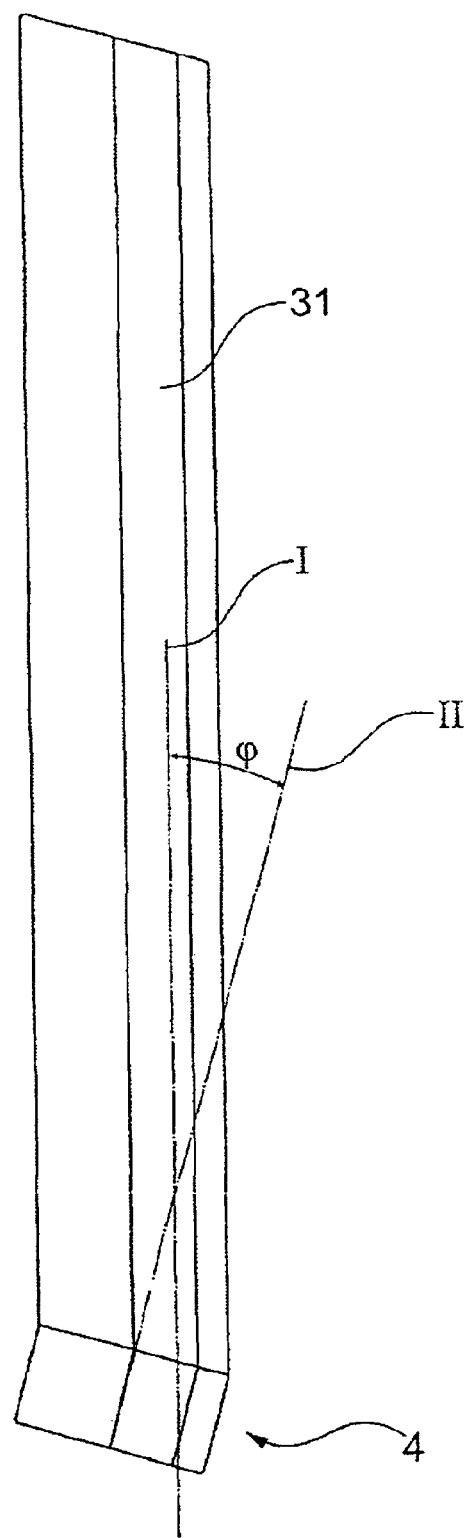

FIGS. 54 and 55 show an embodiment of a tank/filter connection in which a longitudinal axis II which runs through the filter-side tank connecting element 7 is aligned at an inclined angle with respect to a longitudinal axis I which runs through the housing of the filter cartridge 31, in this case preferably at an acute angle φ. This inclined-angle or else bent or else oblique alignment of the filter-side tank connecting element 4 with respect to the rest of the filter housing provides a further form of mechanical coding which can be combined with further coding forms as already described above, in particular with a polygonal connecting element as illustrated here, in the form of an octagon. This octagon can preferably likewise be in the form of a molded seal and, as illustrated here, may have a bypass or blending apparatus in the form of an opening 160 which, when a complementary element is present in the tank-side filter connecting element, allows corresponding blending of the water to be filtered.

FIG. 54 shows the filter cartridge 31 in an oblique view from underneath, in which the filter-side connecting element 4 and its major features can be seen. In contrast, FIG. 55 shows a side view, in which the angle between the cartridge housing 31 and the filter-side tank connection 4 is shown for one angle, which is illustrated by way of example.

Figure 56:
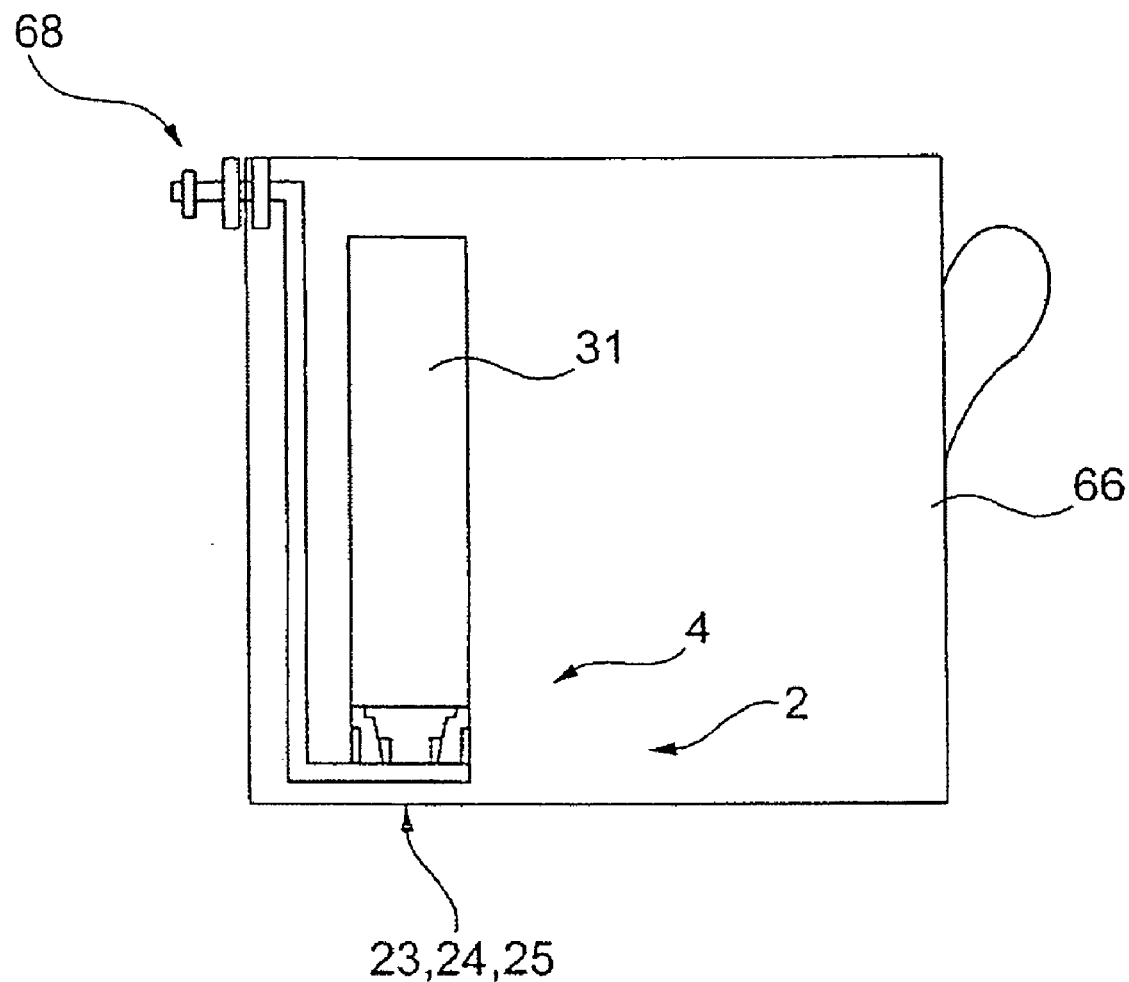

FIG. 56 shows a further embodiment in which the tank 66 is once again in the form of a push-in tank, in which a cartridge 31 for filtering the water contained therein is connected to a tank-side filter connecting element 2. This tank-side connecting element 2 is connected via a line, in this case preferably in the form of a robust tube, to the tank-side appliance connection 68. This tank-side appliance connection 68 is passed to the outside from the tank interior at a distance from the bottom area of the tank 66 during operation. In this embodiment, by way of example, the appliance connection 68 is fixed in a holder which is incorporated in the upper edge of a tank wall and may advantageously be in the form of a detachable connection, so as to allow simple removal and cleaning.

The tank can be operated simply by pushing it into a correspondingly designed holder in an appliance, and it can be filled with fresh water, which will then be filtered by the filter 31, by pulling it out. The tank-side filter connecting element 2 can in this case have all the coding and/or fixing and/or sealing features described above in such a way that, even in this embodiment shown in the drawing (FIG. 56), the use of a filter cartridge which is not provided correctly can be reliably precluded, and, apart from this, this also applies to the embodiment shown in FIGS. 47 to 49.

Figure 57:
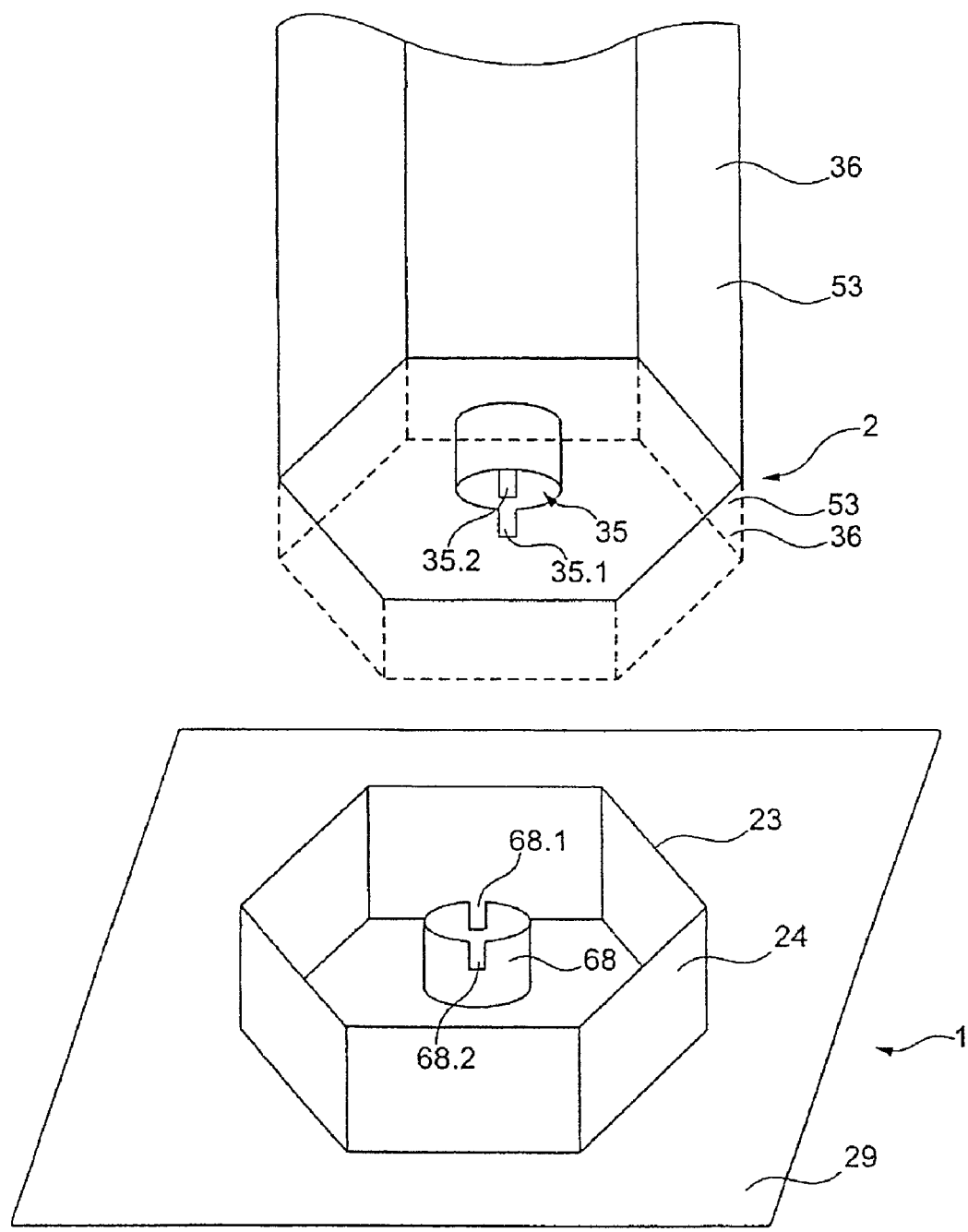

Two further possible embodiments of codings for the connection between the tank and filter are illustrated in and will be described with reference to FIGS. 57 and 58. In FIG. 57, the housing of the filter cartridge 53 itself has a polygonal external contour in the form of a hexagon, which can be inserted into a complementary, tank-side polygonal coding and/or fixing structure 23. The bold solid lines indicate the filter cartridge 53 in a view obliquely from underneath with a base, which is fundamentally planar, at whose center the filter outlet 35 is formed for the filtered water, for example as a cylindrically projecting tube with two attachments 35.1 and 35.2 which project axially at the end. This cylindrically projecting outlet element 35 is coded by the two actually projecting vanes and, with its end face, forms an axial coding and/or sealing structure or contour with respect to the end face of a complementary outlet and holding element 68, which is formed in the tank-side filter connection, with its two coding grooves 68.1 and 68.2. The filter cartridge 53 can be inserted into the tank-side filter connecting element 1 in such a way that it can operate only if the end face of the filter outlet 35 matches and forms a seal with the end face of the tank-side appliance outlet 68.

The hexagonal external contour of the filter cartridge 53, which is illustrated by way of example here, can be inserted, in a fixing manner and possibly also in a sealing manner, into the connecting fitting 23 of the tank-side filter connecting element 1 in the embodiment represented by the solid lines.

In this case, the internal circumference of the connecting fitting 23 is used for fixing and possibly for sealing with respect to the external circumference and with respect to its connection.

In order to indicate a further attachment option between the polygonal external contour, which is illustrated by way of example here as a hexagon, of the filter cartridge 53 and a correspondingly complementary tank-side connecting fitting 1, the housing 36 of the filter cartridge 53 is illustrated by the dashed lines as being extended with respect to the previously described filter base. This polygonal connecting ring, which projects with respect to the bottom of the filter cartridge, can be placed over or likewise plugged in in order to fix the filter cartridge via the tank-side filter connecting fitting 23, once again for fixing and preferably for sealing depending on the embodiment, until the two internal codings of the filter outlet 35 and of the tank outlet 68 rest on one another, forming a seal, and their vane-like and complementary slot-like coding structures, which are illustrated here by way of example, rest on one another or engage in one another, forming a seal. Corresponding openings and/or channels are provided in order to pass water from the tank into the interior of the filter cartridge, although these are not shown here. Corresponding bypass structures can likewise be provided, but are not shown, as have already been described in detail above. FIG. 57 therefore shows the filter cartridge being fixed both on the internal circumference of the tank-side filter connecting element 23 and on its external sealing surface circumference 24.

Figure 58:
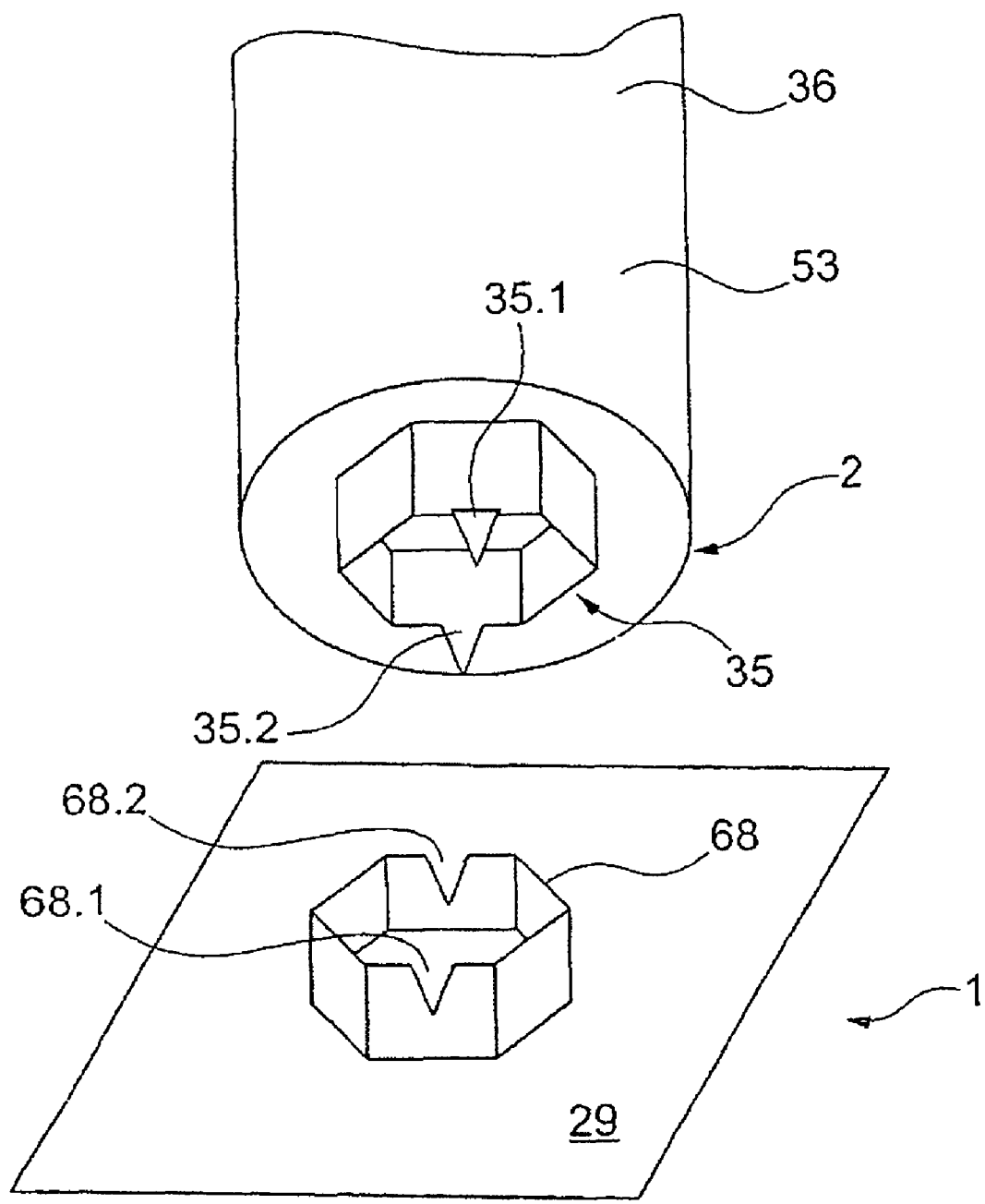

In contrast, FIG. 58 shows an embodiment which has been modified such that the housing 36 of the filter cartridge is illustrated, by way of example, as being round and the filter outlet 35 as a polygonal structure, in this case once again by way of example in the form of a hexagon, which additionally once again has end coding in the form of two axially projecting, coding, triangular points or vanes. In this case as well, the filter cartridge can be connected to the tank-side filter connecting element 1 in such a manner that they can operate only if the two outlet structures 35 and 68 can be joined to one another at the end, axially, forming a seal. Further coding and/or fixing structures have not been illustrated, for clarity reasons. However, all of the structures which have already been described above can also be provided in a corresponding manner here. It can also be said for the two embodiments corresponding to FIGS. 57 and 58 that these coding structures can also be interchanged between the filter side and the tank side, and/or can be modified and/or can have further contours and/or structures added to them.

Figure 59:
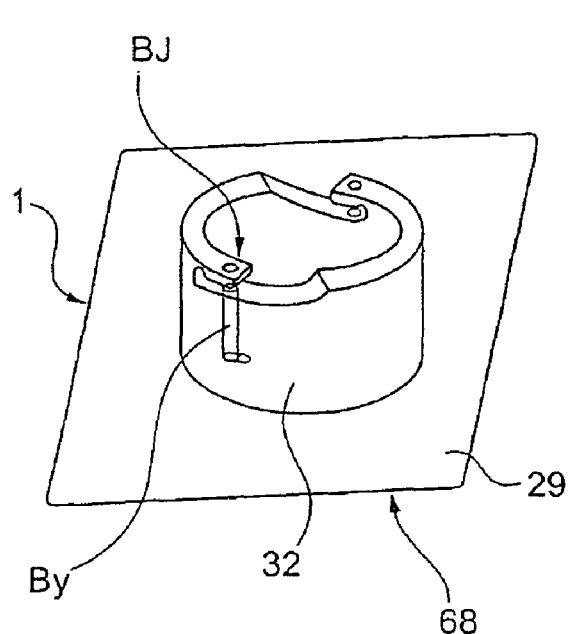
Figure 60:
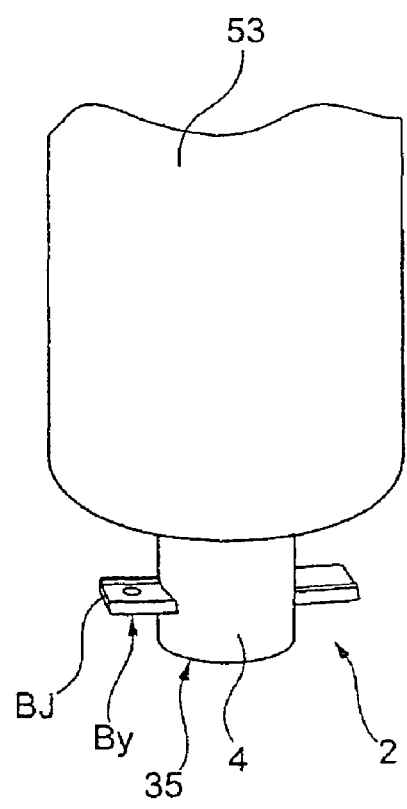

Two further embodiment options relating to a bypass configuration between a tank-side filter connecting element 1 and a filter-side tank connecting element 2 are illustrated in FIGS. 59 to 62. In this case, FIGS. 59 and 60 illustrate, by way of example and schematically, a bypass arrangement BY which allows blending between water that has been filtered by the filter cartridge 53 and water which has not been filtered or prepared, or has been filtered or prepared in some other way. The bypass or blending path BY is in this embodiment combined with a bayonet fitting BJ, such that a corresponding opening BY is provided in a bayonet vane BJ, which opening BY corresponds to a further bypass opening BY, which is arranged on a bayonet slot BJ that is complementary to the bayonet vane, such that, when a filter cartridge is inserted correctly, a corresponding bypass path is provided. In the embodiment illustrated here, the bypass opening BY which is shown in the tank-side filter connecting element 1 is passed from the end connecting area of the tank-side connecting fitting to below the point at which the filter-side tank connecting stub 4 ends at a position that is used during operation such that the bypass water which bypasses the filter bed in the filter cartridge 53 is mixed with the water that has been filtered by the filter bed in the filter cartridge 53, and is supplied to the tank-side appliance connection 68.

Figure 61:
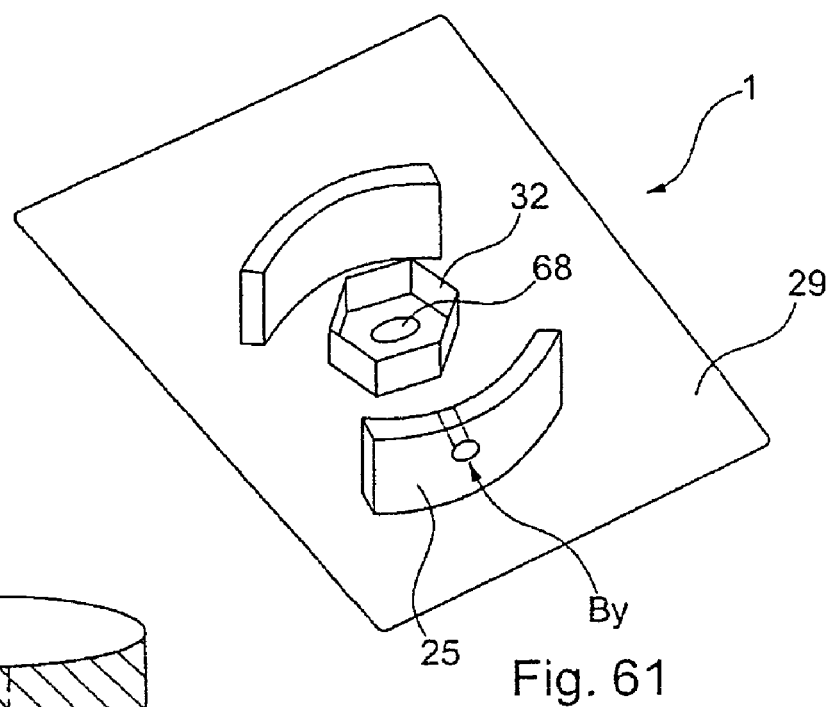

FIGS. 61 and 62 illustrate a further embodiment in which the bypass path BY is passed via a preparation and/or filter path which is separate from a main filter bed HF of the filter cartridge 53 and is illustrated here, by way of example and symbolically, as a secondary filter path NF. This second preparation and/or filter path NF may contain, for example, an activated-charcoal filter path and/or other preparation mechanisms and/or media. After flowing through this secondary filter path NF, the water which has been passed via this bypass path BY is mixed with the water which has been filtered by the filter path HF of the filter cartridge 53, in such a way that it can likewise be drawn off through the tank-side appliance connection 68.

In the embodiment of the filter cartridge 53 as shown in FIG. 62, the combination of the two water paths, which have been passed and prepared separately via the main filter HF and via the secondary filter NF respectively, in the interior of the filter cartridge 53 is illustrated, by way of example and schematically, by an opening into the inner falling line of the filter cartridge 53. In a modified embodiment, however, a dedicated outlet opening from the filter cartridge in the direction of the tank-side appliance connection 68 can invariably also be provided, in addition or as an alternative, in which case it can possibly be said for all three embodiments that they all open within the tank-side filter connecting stub 4 such that, once again by way of example, sealing is possible by an interlock between the two polygonal connecting elements of the tank and of the filter.

The bypass flow can be introduced into the secondary filter path only when the opening BY, which likewise acts as coding, on a coding element on outer shell 25, which projects axially upwards from the tank bottom 29, with the corresponding filter-side bypass opening BY is inserted in the state intended for operation. If these two openings do not coincide, then no corresponding blending can take place. The tank-side filter connection 1 is likewise illustrated only schematically and by way of example and can be provided with widely different variants of the coding and connecting structure already described above such that, if required, only a single one of all six annular alignments that are possible here is allowed for a permissible filter termination. Such coding structures have not been illustrated at this point, for clarity reasons.

In principle, it can also be said for these embodiments in FIGS. 59 to 62 that they can also be combined with all of the coding and/or fixing and/or sealing structures described above.

List of Reference Symbols:
- 1 Connecting fitting or connecting stub or tank side connecting element
- 2 Tank connecting element
- 4 Connecting stub or connecting element
- 6 Side slot or aperture opening
- 23 Connecting fitting or connecting element or axial projections or axial recess on the tank bottom or fixing structure
- 24 Sealing surface or external circumference
- 25 Outer shell
- 26 Blocking element
- 27 Bottom rib
- 28 Bottom rib
- 29 Tank bottom
- 30 Inner rib
- 31 Filter cartridge
- 32 Molded seal
- 33 Sealing surface
- 34 Inlet slot
- 35 Outlet-flow opening
- 36 Filter cartridge housing
- 37 Snap-action element
- 38 axial recess or receptacles
- 39 end faces or lower edge
- 40 Stop
- 41 Bottom opening
- 42 Groove
- 43 Key element
- 44 Tank connecting area
- 45 Bottom
- 46 Axial seal
- 47 Separating line
- 48 Disk
- 49 Annular shoulder
- 50 Valve body
- 51 Spring
- 52 Tank bottom
- 53 Filter cartridge
- 54 Connecting fitting
- 55 Outer surface
- 56 Outlet-flow line
- 57 Seal
- 58 Wall
- 59 Wall
- 60 Cutout or aperture opening or hole or bypass opening
- 61 Opening
- 62 Fitting wall
- 63 Fitting wall
- 64 Fitting wall
- 65 Bypass opening
- 66 Tank
- 67 Suction connection
- 68 Appliance connection or tank outlet or appliance inlet area or tank side appliance connection
- 69 Longitudinal axis
- 70 Intermediate space
- 71 Rim
- 72 Connecting element
- 73 Cartridge
- 74 Foot
- 75 Inlet opening
- 76 Inlet opening
- 77 Connecting fitting or connecting element or filter connection
- 78 Baseplate
- 79 Sealing surface
- 80 Sealing surface
- 81 Molded seal
- 82 Outlet
- 83 Outer wall
- 84 Outer shell
- 85 Adapter
- 86 Adapter
- 87 Axial projection
- 88 Axial projection
- 89 Axial projection
- 90 Axial projection
- 91 Axial projection
- 92 Axial projection
- 93 Axial projection
- 94 Axial projection
- 95 Axial projection
- 96 Axial recess
- 97 Axial recess
- 98 Axial recess
- 99 Axial projection

What is claimed is:

1. In a tank of an appliance using water having a suction connection provided on the tank and a filter connection with a mating connection for a filter cartridge in the interior portion of the tank, wherein the improvement comprises a tank, said tank having a tank connection fitting disposed on an inside surface of the tank, said tank connection fitting having a filter connection and a tank coding structure, said tank coding structure having at least one polygonal axial projection projecting from the connection fitting and/or at least one polygonal axial recess on the connection fitting to fit a complementary filter connection on a filter cartridge and to match a matching filter cartridge polygonal coding structure to match said tank coding structure and provide a mating connection employing a key/lock principle.

2. The tank as claimed in claim 1 wherein the tank connecting fitting mates with a connecting stub on the filter cartridge to form a second mating connection.

3. The tank as claimed in claim 2 wherein the second mating connection of the tank coding structure extends in the axial and/or radial direction with respect to the axis of the connecting stub of the filter cartridge.

4. The tank as claimed in claim 1 or 2 wherein the tank coding structure functions at the same time as fixing elements (16) for attachment of the filter cartridge.

5. The tank as claimed in claim 1 or 2 further comprising a sealing surface disposed on the filter cartridge to provide an axial seal.

6. The tank as claimed in claim 1 wherein the coding structure is determined by the number, or a spatial distribution or shape of individual coding elements of the tank coding structure.

7. The tank as claimed in claim 1 wherein the tank coding structure is provided on a circumference of the tank connecting fitting disposed on the inside of the tank.

8. The tank as claimed in claim 1 wherein the tank connecting fitting (1) has an appliance connection (68) connected to a suction connection (67).

9. The tank as claimed in claim 1 wherein the tank coding structure of the filter connection has a molded seal (32) with a correspondingly formed circumferential surface.

10. The tank as claimed in claim 2 further comprising a second filter cartridge coding structure (37, 38) arranged externally on the housing of the filter cartridge for matching the second mating connection of the tank coding structure in an installed state.

11. The tank as claimed in claim 1 or 2 further comprising a seal (32) with a coding structure disposed between the tank connection fitting of the tank and the mating connection of the filter cartridge.

12. The tank as claimed in claim 1 further comprising an opening in the tank connecting fitting with a further coding structure for insertion of a matching filter cartridge with a further coding structure having a key element.

13. The tank as claimed in claim 1 wherein the tank coding structure has a plurality of radial coding structures.

14. The tank as claimed in claim 1 wherein the tank coding structure has a circumferential shape with a rotationally symmetrical cross section.

15. The tank as claimed in claim 14 wherein the tank filter connection with a tank coding structure has a sealing surface (24).

16. An adapter (85) for connecting a filter cartridge (31) to a tank comprising:
   (a) an adapter housing having a first end and a second end;
   (b) the first end of said adapter housing having an opening for sealably connecting with a filter cartridge or a tank opening; and
   (c) the second end of said adapter housing having an opening and a coding structure having at least one axial projection having a polygonal shape and/or at least one axial recess having a polygonal shape for mating with a complementary polygonal coding structure of a matching filter cartridge (31) or a matching polygonal coding structure of the tank opening.

17. An appliance which uses drawn water having a water filter comprising a tank, said tank having an outlet and a tank connecting fitting disposed on the inside or on a conduit connected to the inside of the tank, said connecting fitting having a mating filter connection and a mating coding structure, said mating coding structure having at least one polygonal axial projection projecting from the tank connecting fitting and/or at least one polygonal axial recess on the connecting fitting to fit a complementary coding structure on a matching filter cartridge in a key/lock interlocking arrangement to accept and brace fit in the axial direction a matching filter cartridge.

18. A filter cartridge for insertion into a tank of a water drawing appliance comprising:
   (a) a filter housing having a filter coding structure disposed on the filter housing having at least one axial projection having a polygonal shape and/or at least one axial recess having a polygonal shape for mating with a corresponding tank coding structure in an interlocking key/lock manner to provide a polygonal mating connection;
   (b) a seal disposed on said filter housing with said coding structure preventing operation of the seal unless the coding structure disposed on the filter housing first matches with the corresponding tank coding structure; and
   (c) a connection disposed on said filter housing to connect with a tank outlet connection and provide for the operation of the seal after the mating of the polygonal mating connection between the tank coding structure and the filter coding structure.

19. The filter cartridge of claim 18 wherein said filter housing has a second mating connection radially displaced from and encircled by the polygonal mating connection between the tank coding structure and the filter coding structure.

20. A tank having a coding and axial seal attachment combination comprising:
   (a) a tank having a tank bottom and a tank outlet;
   (b) a polygonal tank coded encipherment disposed on the tank bottom or the tank outlet having at least one axial projection or recess and a plurality of radial vanes disposed on the polygonal tank coded encipherment to provide selective mating with a corresponding polygonal coded encipherment on a filter cartridge having at least one axial projection or recess and a plurality or radial vanes;
   (c) a tank bayonet fitting for accepting a corresponding bayonet fitting on the filter cartridge having a corresponding polygonal coded encipherment and bayonet fitting to provide a snap fitting of the filter cartridge; and
   (d) an axial seal or an axial seal seat disposed on said polygonal tank coded encipherment, said tank bottom or said tank outlet which seal is axially accepted or rejected by the polygonal coded encipherment and which axially fits and braces the filter cartridge into operation by the bayonet fitting.

21. The tank of claim 20 wherein the plurality of radial vanes on the polygonal tank coded encipherment are less elastic than the radial vanes on the filter cartridge polygonal tank coded encipherment to impart a greater spring-like press fit and lock by the bayonet fitting.

* * * * *

UNITED STATES PATENT AND TRADEMARK OFFICE
CERTIFICATE OF CORRECTION

PATENT NO.       : 8,354,023 B2  
APPLICATION NO.  : 12/310062  
DATED            : January 15, 2013  
INVENTOR(S)      : Kurt Wallerstorfer et al.

Page 1 of 1

It is certified that error appears in the above-identified patent and that said Letters Patent is hereby corrected as shown below:

On the Title Page, Item (75), the address of one of the joint inventors, Mr. Roland Scholz should be:

Roland Scholz, Balgach (CH)

Signed and Sealed this  
Sixth Day of January, 2015

Michelle K. Lee  
*Deputy Director of the United States Patent and Trademark Office*